US011689726B2

(12) United States Patent
Mukherjee et al.

(10) Patent No.: US 11,689,726 B2
(45) Date of Patent: Jun. 27, 2023

(54) HYBRID MOTION-COMPENSATED NEURAL NETWORK WITH SIDE-INFORMATION BASED VIDEO CODING

(71) Applicant: GOOGLE LLC, Mountain View, CA (US)

(72) Inventors: Debargha Mukherjee, Cupertino, CA (US); Urvang Joshi, Mountain View, CA (US); Yue Chen, Kirkland, WA (US); Sarah Parker, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 16/516,784

(22) Filed: Jul. 19, 2019

(65) Prior Publication Data

US 2020/0186809 A1 Jun. 11, 2020

Related U.S. Application Data

(60) Provisional application No. 62/775,481, filed on Dec. 5, 2018.

(51) Int. Cl.
*H04N 19/147* (2014.01)
*H04N 19/184* (2014.01)
*H04N 19/59* (2014.01)
*G06N 3/04* (2023.01)

(52) U.S. Cl.
CPC ............ *H04N 19/147* (2014.11); *G06N 3/04* (2013.01); *H04N 19/184* (2014.11); *H04N 19/59* (2014.11)

(58) Field of Classification Search
CPC .... H04N 19/147; H04N 19/184; H04N 19/59; G06N 3/04
See application file for complete search history.

(56) References Cited

U.S. PATENT DOCUMENTS

| | | | | |
|---|---|---|---|---|
| 2015/0016510 | A1* | 1/2015 | Carlsson | H04N 19/146 375/240.03 |
| 2017/0264902 | A1 | 9/2017 | Ye et al. | |
| 2018/0307984 | A1* | 10/2018 | Koker | G06N 3/08 |
| 2019/0294980 | A1* | 9/2019 | Laukien | G06N 5/04 |
| 2020/0059669 | A1* | 2/2020 | Nishi | H04N 19/176 |

OTHER PUBLICATIONS

Bankoski, et al., "Technical Overview of VP8, An Open Source Video Codec for the Web", Jul. 11, 2011, 6 pp.

(Continued)

*Primary Examiner* — Nasim N Nirjhar
(74) *Attorney, Agent, or Firm* — Young Basile Hanlon & MacFarlane, P.C.

(57) ABSTRACT

A hybrid apparatus for coding a video stream includes a first encoder. The first encoder includes a neural network having at least one hidden layer, and the neural network receives source data from the video stream at a first hidden layer of the at least one hidden layer, receives side information correlated with the source data at the first hidden layer, and generates guided information using the source data and the side information. The first encoder outputs the guided information and the side information for a decoder to reconstruct the source data.

20 Claims, 15 Drawing Sheets

1112
Entropy Coder
1400A 1400B 1106 1410 1400C 1400D
X 1102
CNN CNN Q Q Q Q CNN CNN CNN
$X_d$ 1110
Y
Encoder NN 1104
Decoder NN 1108

(56) References Cited

OTHER PUBLICATIONS

Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.
International Search Report and Written Opinion of International Application No. PCT/US2019059597 dated Mar. 13, 2020; 15 pages.
Pfaff J et al.; "Neural netowrk based intra prediction for video coding"; Proceedings of SPIE; issue 0277-786x vol. 10752; Sep. 17, 2018; pp. 1075213.

* cited by examiner

HYBRID MOTION-COMPENSATED NEURAL NETWORK WITH SIDE-INFORMATION BASED VIDEO CODING

CROSS-REFERENCE TO RELATED APPLICATION

This application claims priority to U.S. Patent Application No. 62/755,481, filed Dec. 5, 2018, which is incorporated herein in its entirety by reference.

BACKGROUND

Digital video streams may represent video using a sequence of frames or still images. Digital video can be used for various applications, including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

SUMMARY

One aspect of the disclosed implementations is a first encoder comprising a neural network having at least one hidden layer, wherein the neural network receives source data from the video stream at a first hidden layer of the at least one hidden layer, receives side information correlated with the source data at the first hidden layer, and generates guided information using the source data and the side information. The first encoder outputs the guided information and the side information to a decoder for reconstruction of the source data.

A method for coding a video stream described herein includes providing source data from the video stream to a first encoder including a neural network, generating, using the source data, side information, inputting the side information to the neural network for encoding the source data, and transmitting the source data and the side information from the first encoder to a decoder.

Another hybrid apparatus for coding a video stream described herein includes a first encoder and a first decoder comprising a neural network having a plurality of hidden layers. The neural network receives source data from the video stream at a first hidden layer of the encoder, receives side information correlated with the source data at the first hidden layer of the encoder, generates guided information using the source data and the side information, and receives the guided information and the side information at a first hidden layer of the first decoder for reconstruction of the source data.

These and other aspects of the present disclosure are disclosed in the following detailed description of the embodiments, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
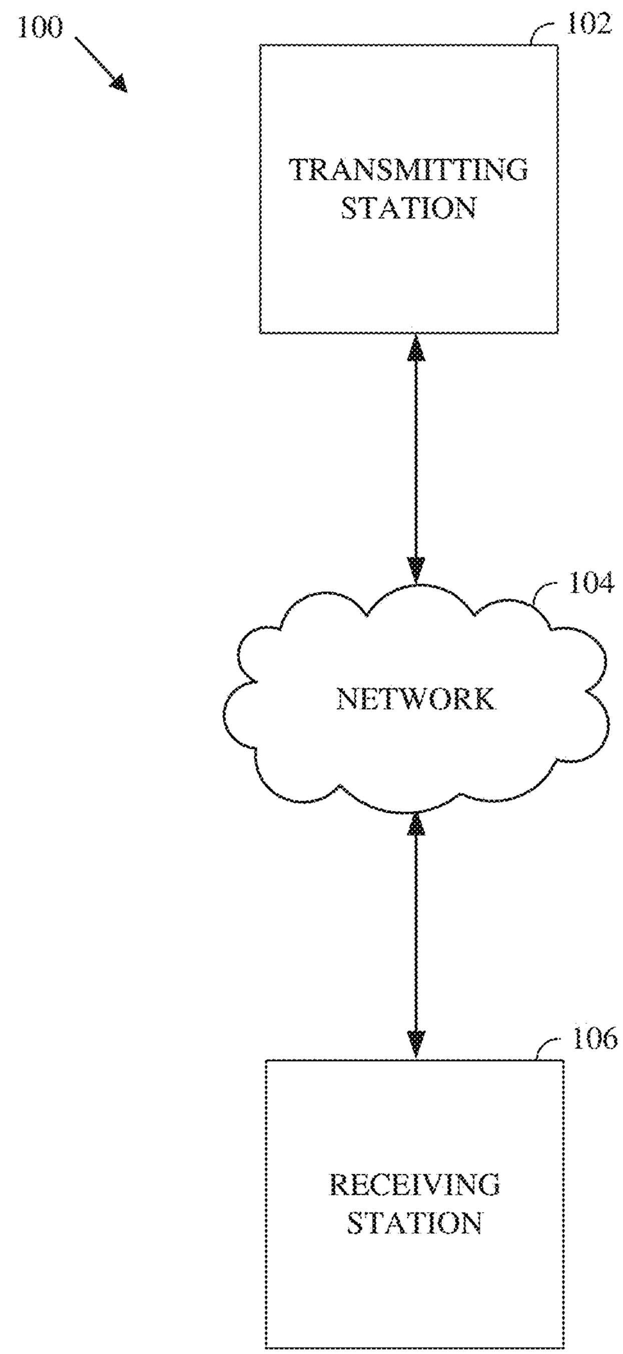
FIG. 1 is a schematic of a video encoding and decoding system.

Encoding techniques may be designed to maximize coding efficiency. Coding efficiency can mean encoding a video at the lowest possible bit rate while minimizing distortion (e.g., while maintaining a certain level of video quality). Coding efficiency is typically measured in terms of both rate and distortion. Rate refers to the number of bits required for encoding (such as encoding a block, a frame, etc.). Distortion measures the quality loss between, for example, a source video block and a reconstructed version of the source video block. For example, the distortion may be calculated as a mean-square error between pixel values of the source block and those of the reconstructed block. By performing a rate-distortion optimization process, a video codec optimizes the amount of distortion against the rate required to encode the video.

Modern video codecs (e.g., H.264, which is also known as MPEG-4 AVC; VP9; H.265, which is also known as HEVC; AVS2; and AV1) define and use a large number of tools and configurations (e.g., parameters) to improve coding efficiency. A video encoder can use a mode decision to examine (e.g., test, evaluate, etc.) at least some of the valid combinations of parameters to select a combination that results in a relatively low rate-distortion value. An example of a mode decision is an intra-prediction mode decision, which determines the best intra-prediction mode for coding a block. Another example of a mode decision is a partition decision, which determines an optimal sub-partitioning of a coding unit (also known as a coding tree unit or CTU). Another example of a mode decision includes a decision as to a transform type to use in transforming a block (such as a residual or an image block) from the pixel domain to the frequency domain to form a transform block that includes transform coefficients.

To evaluate whether one combination is better than another, a metric can be computed for each of the examined combinations and the respective metrics compared. In an example, the metric can combine the rate and distortion described above to produce a rate-distortion (RD) value or cost. The RD value or cost may be a single scalar value.

Quantization parameters in video codecs can be used to control the tradeoff between rate and distortion. Usually, a larger quantization parameter means higher quantization (such as of transform coefficients) resulting in a lower rate but higher distortion; and a smaller quantization parameter means lower quantization resulting in a higher rate but a lower distortion. The variables QP, q, and Q may be used interchangeably in this disclosure to refer to a quantization parameter.

The value of the quantization parameter can be fixed. For example, an encoder can use one quantization parameter value to encode all frames and/or all blocks of a video. In other examples, the quantization parameter can change, for example, from frame to frame. For example, in the case of a video conference application, the encoder can change the quantization parameter value(s) based on fluctuations in network bandwidth.

As the quantization parameter can be used to control the tradeoff between rate and distortion, the quantization parameter can be used to calculate the RD cost associated with a respective combination of parameters. The combination resulting in the lowest cost (e.g., lowest RD cost) can be used for encoding, for example, a block or a frame in a compressed bitstream. That is, whenever an encoder decision (e.g., a mode decision) is based on the RD cost, the QP value may be used to determine the RD cost.

In an example, the QP can be used to derive a multiplier that is used to combine the rate and distortion values into one metric. Some codecs may refer to the multiplier as the Lagrange multiplier (denoted $\lambda_{mode}$); other codecs may use a similar multiplier that is referred as rdmult. Each codec may have a different method of calculating the multiplier. Unless the context makes clear, the multiplier is referred to herein, regardless of the codec, as the Lagrange multiplier or Lagrange parameter.

To reiterate, the Lagrange multiplier can be used to evaluate the RD costs of competing modes (i.e., competing combinations of parameters). Specifically, let $r_m$ denote the rate (in bits) resulting from using a mode m and let $d_m$ denote the resulting distortion. The rate distortion cost of selecting the mode m can be computed as a scalar value: $d_m+\lambda_{mode}r_m$. By using the Lagrange parameter $\lambda_{mode}$, it is then possible to compare the cost of two modes and select one with the lower combined RD cost. This technique of evaluating rate distortion cost is a basis of mode decision processes in at least some video codecs.

Different video codecs may use different techniques to compute the Lagrange multipliers from the quantization parameters. This is due in part to the fact that the different codecs may have different meanings (e.g., definitions, semantics, etc.) for, and method of use of, quantization parameters.

Codecs (referred to herein as H.264 codecs) that implement the H.264 standard may derive the Lagrange multiplier $\lambda_{mode}$ using formula (1):

$$\lambda_{mode}=0.85\times 2^{(QP-12)/3} \quad (1)$$

Codecs (referred to herein as HEVC codecs) that implement the HEVC standard may use a formula that is similar to the formula (1). Codecs (referred to herein as H.263 codecs) that implement the H.263 standard may derive the Lagrange multipliers $\lambda_{mode}$ using formula (2):

$$\lambda_{mode}=0.85\cdot Q_{H263}^{2} \quad (2)$$

Codecs (referred to herein as VP9 codecs) that implement the VP9 standard may derive the multiplier rdmult using formula (3):

$$rd\text{mult}=88\cdot q^{2}/24 \quad (3)$$

Codecs (referred to herein as AV1 codecs) that implement the AV1 standard may derive the Lagrange multiplier $\lambda_{mode}$ using formula (4):

$$\lambda_{mode}=0.12\cdot Q_{AV1}^{2}/256 \quad (4)$$

As can be seen in the above cases, the multiplier has a non-linear relationship to the quantization parameter. In the cases of HEVC and H.264, the multiplier has an exponential relationship to the QP; and in the cases of H.263, VP9, and AV1, the multiplier has a quadratic relationship to the QP. Note that the multipliers may undergo further changes before being used in the respective codecs to account for additional side information included in a compressed bitstream by the encoder. Examples of side information include picture type (e.g., intra vs. inter predicted frame), color components (e.g., luminance or chrominance), and/or region of interest. In an example, such additional changes can be linear changes to the multipliers.

As mentioned above, a best mode can be selected from many possible combinations. For example, the RD cost associated with a specific mode (or a specific combination of tools) may be determined by performing at least a subset of the encoding steps of the encoder. The subset of the encoding steps can include, depending on the mode for which an RD cost is to be determined, at least one of determining a prediction block, determining a residual block, determining a transform type, determining an interpolation filter, quantizing a transform block, entropy-encoding (such as using a hypothetical encoder), and so on. Note that these encoding steps are neither intended to be an exhaustive list of encoding steps that a typical encoder may perform nor presented in any particular order (that is, an encoder does not necessarily perform these steps, as listed, sequentially). As the number of possible tools and parameters increases, the number of combinations also increases, which, in turn, increases the time required to determine the best mode.

Techniques such as machine learning may be exploited to reduce the time required to determine the best mode. Machine learning can be well suited to address the computational complexity problem in video coding. For example, instead of performing all of the encoding steps (i.e., a brute-force or exhaustive approach) for determining a rate and a distortion (or, equivalently, an RD cost) associated with mode, a machine-learning model can be used to estimate the rate and the distortion, or to estimate the RD cost, associated with the mode. Then, the best mode may be selected based on the, e.g., lowest, RD cost.

The machine-learning model may be trained using the vast amount of training data that is available from an encoder performing standard encoding techniques, such as those described with respect to FIGS. 4 and 6-9. More specifically, the training data can be used during the learning phase of machine learning to derive (e.g., learn, infer, etc.) the machine-learning model that is (e.g., defines, constitutes, etc.) a mapping from the input data to an output, in this example a RD cost that can be used to make one or more mode decisions.

The predictive capabilities (i.e., accuracy) of a machine-learning model are as good as the inputs used to train the machine-learning model and the inputs presented to the machine-learning model to predict a result (e.g., the best mode). Once a machine-learning model is trained, the model computes the output as a deterministic function of its input. In an example, the machine-learning model can be a neural network model, which can be a convolutional neural-network (CNN). Further details of a neural network model, including a CNN, will be discussed below in regards to FIGS. 12-14.

As may be discerned from the above description, a machine-learning model can be used to decide (e.g., select, choose, etc.) a mode from among multiple available modes in a coding process for a block, such as an image block, a prediction block, or a transform. This can be a powerful tool for image compression. However, video compression relies heavily on exploiting temporal redundancies between frames, hence introducing a third dimension—time and hence movement—to the horizontal and vertical dimensions of the pixels. Learning motion fields from a three-dimensional volume of data using machine learning is possible, but an additional degree of complexity is involved. According to the teachings herein, information (e.g., motion information) derived from conventional encoding methods may be made available for reconstruction of video data compressed, at least in part, using machine learning. This is achieved using a deep neural network having structural constraints that enforce the availability of the information at the decoder.

The neural network is described herein first with reference to a block-based codec with the teachings may be incorporated. Although a block-based codec is described as an example, other codecs may be used with the present teachings, including a feature-based codec.

FIG. 1 is a schematic of a video encoding and decoding system 100. A transmitting station 102 can be, for example, a computer having an internal configuration of hardware, such as that described with respect to FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
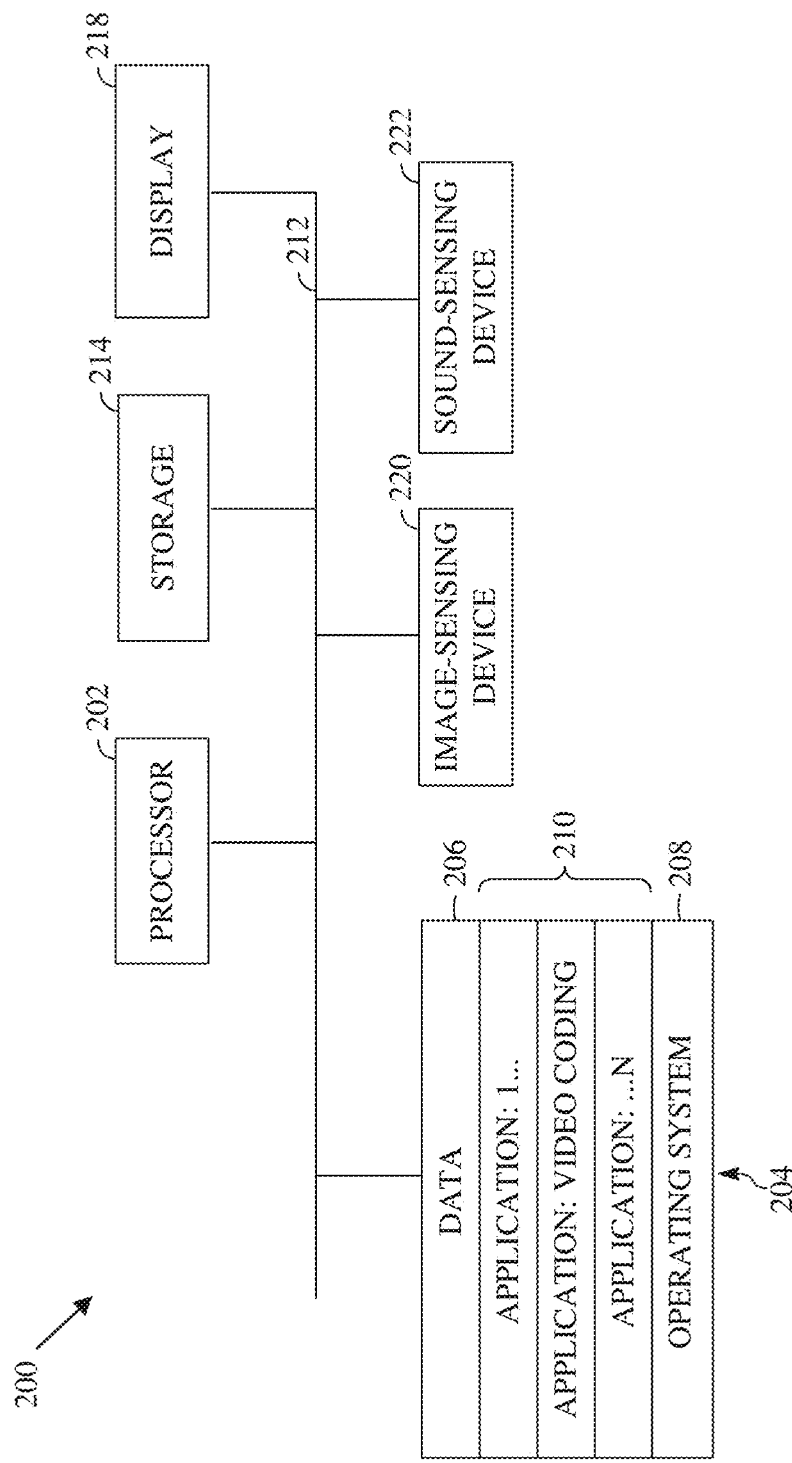
FIG. 2 is a block diagram of an example of a computing device that can implement a transmitting station or a receiving station.

In one example, the receiving station 106 can be a computer having an internal configuration of hardware, such as that described with respect to FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP, e.g., a Hypertext Transfer Protocol (HTTP)-based video streaming protocol, may be used.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, now-existing or hereafter developed, capable of manipulating or processing information. Although the disclosed implementations can be practiced with a single processor as shown (e.g., the CPU 202), advantages in speed and efficiency can be achieved by using more than one processor.

In an implementation, a memory 204 in the computing device 200 can be a read-only memory (ROM) device or a random-access memory (RAM) device. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described herein. For example, the application programs 210 can include applications 1 through N, which further include a video coding application that performs the methods described herein. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch-sensitive display that combines a display with a touch-sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including as a liquid crystal display (LCD); a cathode-ray tube (CRT)

display; or a light-emitting diode (LED) display, such as an organic LED (OLED) display.

The computing device 200 can also include or be in communication with an image-sensing device 220, for example, a camera, or any other image-sensing device, now existing or hereafter developed, that can sense an image, such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device, now existing or hereafter developed, that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly or across a local area or other network. The memory 204 can be distributed across multiple machines, such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit, such as a memory card, or multiple units, such as multiple memory cards. The computing device 200 can thus be implemented in a wide variety of configurations.

Figure 3:
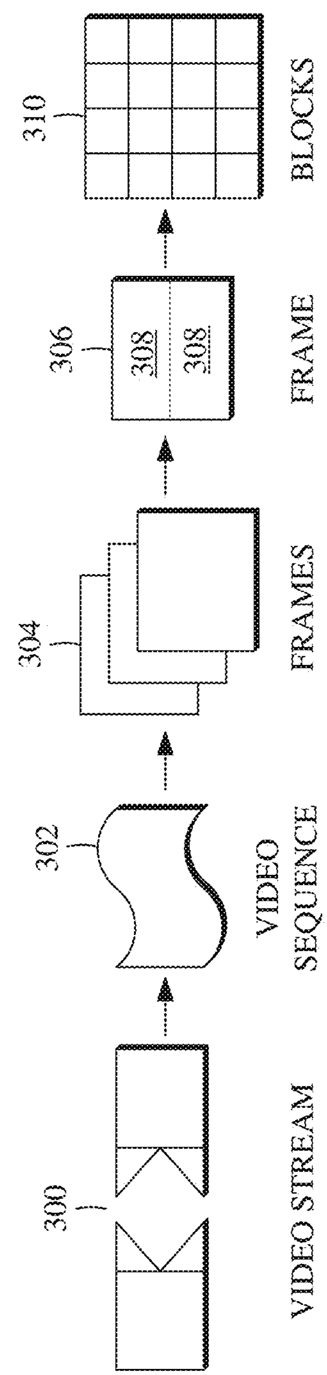
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size, such as 4×4 pixels, 8×8 pixels, 16×8 pixels, 8×16 pixels, 16×16 pixels, or larger.

Figure 4:
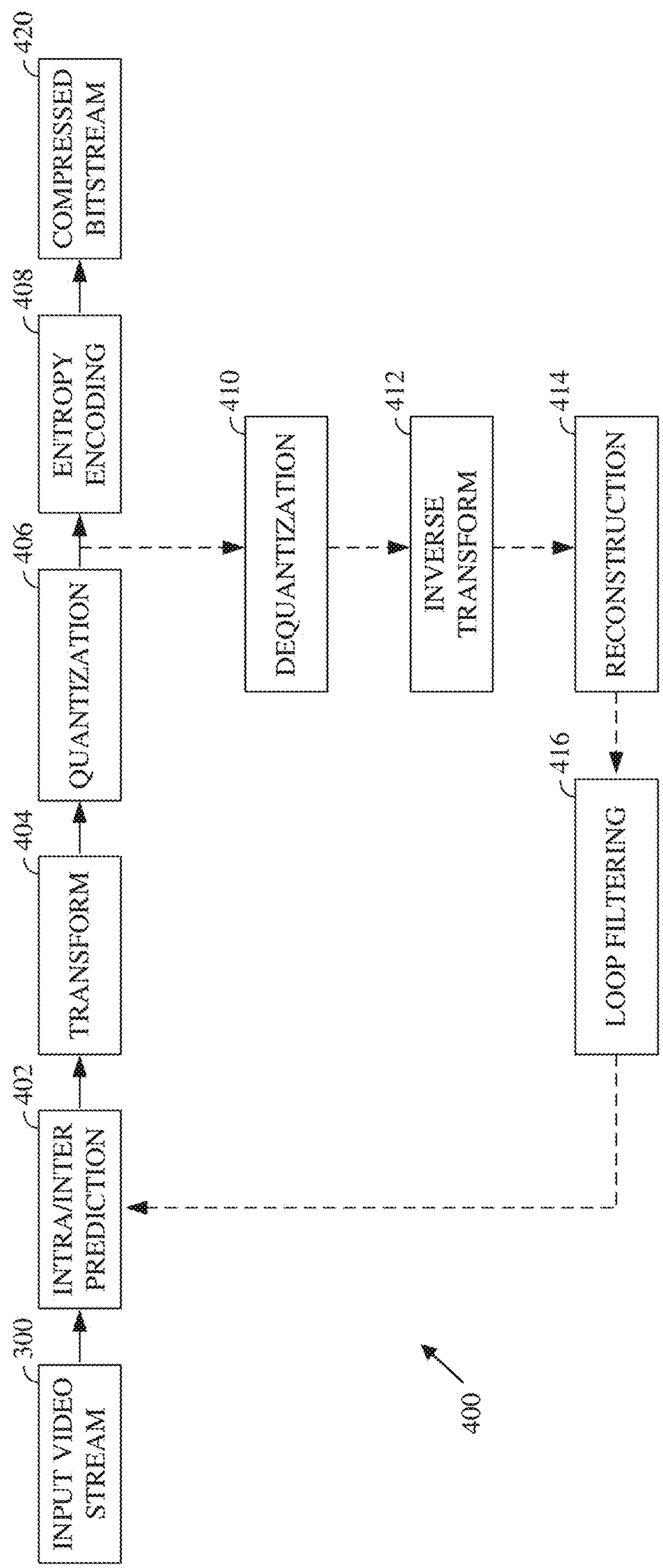
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102, such as by providing a computer software program stored in memory, for example, the memory 204. The computer software program can include machine instructions that, when executed by a processor, such as the CPU 202, cause the transmitting station 102 to encode video data in manners described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter-prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter-prediction stage 402, a block can be encoded using intra-frame prediction (also called intra-prediction) or inter-frame prediction (also called inter-prediction), or a combination of both. In any case, a prediction block can be formed. In the case of intra-prediction, all or part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter-prediction stage 402 to produce a residual block (also called a residual). The transform stage 404 transforms the residual into transform coefficients in, for example, the frequency domain using block-based transforms. Such block-based transforms (i.e., transform types) include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient is at the top-left of the matrix, and the highest frequency coefficient is at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block (which may include, for example, the type of prediction used, transform type, motion vectors, and quantizer value), are then output to the compressed bitstream 420. The information to decode the block may be entropy coded into block, frame, slice, and/or section headers within the compressed bitstream 420. The compressed bitstream 420 can also be referred to as an encoded video stream or encoded video bitstream; these terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process and that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter-prediction stage 402 can be added to the derivative residual to create a reconstructed block. The loop filtering stage 416 can be applied to the reconstructed block to reduce distortion, such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
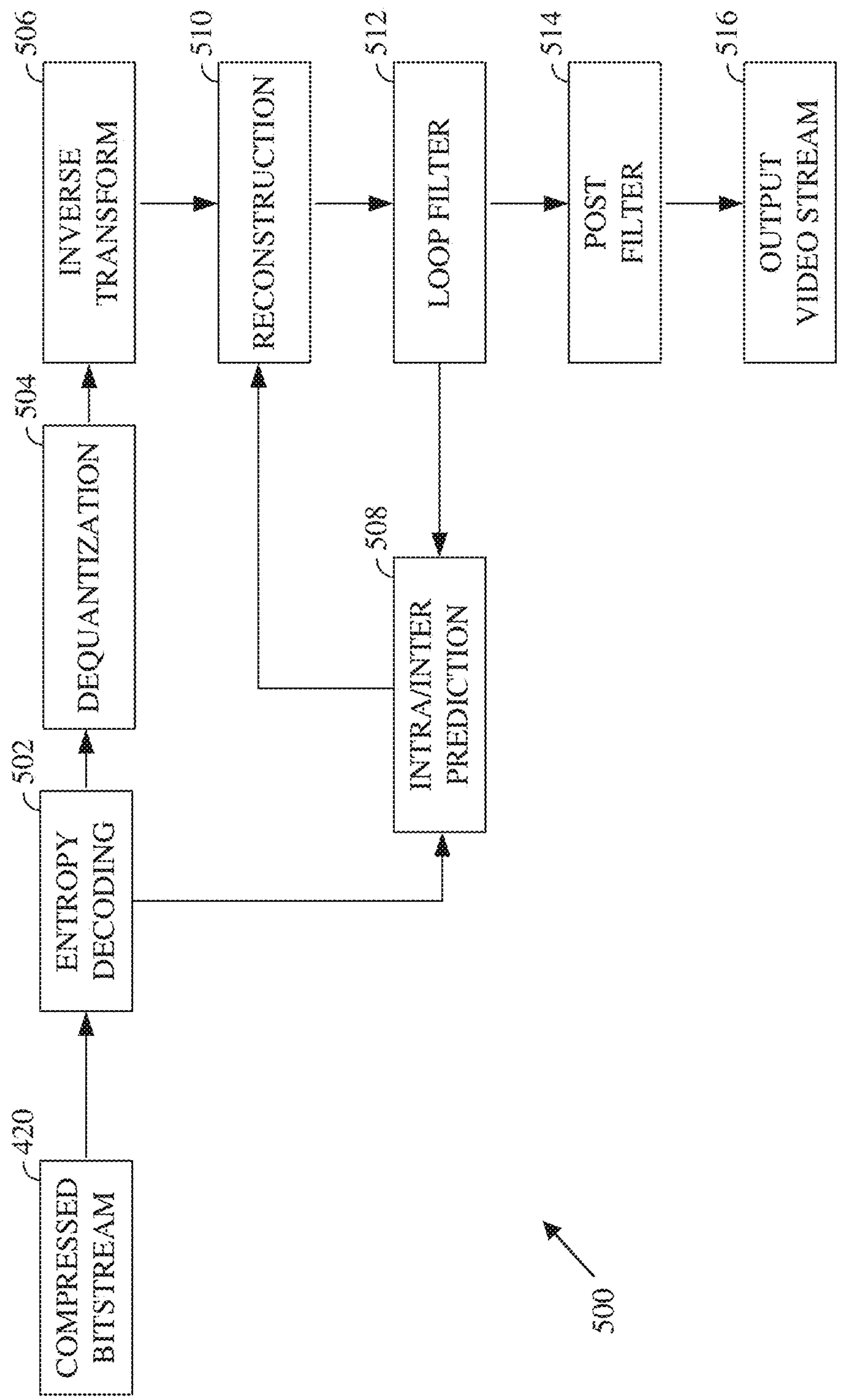
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor, such as the CPU 202, cause the receiving station 106 to decode video data in the manners described below. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512, and a post filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, for example, at the intra/inter-prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In an example, the post filtering stage 514 is applied to the reconstructed block to reduce blocking distortion, and the result is output as an output video stream 516. The output video stream 516 can also be referred to as a decoded video stream; these terms will be used interchangeably herein.

Other variations of the decoder 500 can be used to decode the compressed bitstream 420. For example, the decoder 500 can produce the output video stream 516 without the post filtering stage 514. In some implementations of the decoder 500, the post filtering stage 514 is applied after the loop filtering stage 512. The loop filtering stage 512 can include an optional deblocking filtering stage. Additionally, or alternatively, the encoder 400 includes an optional deblocking filtering stage in the loop filtering stage 416.

Figure 6:
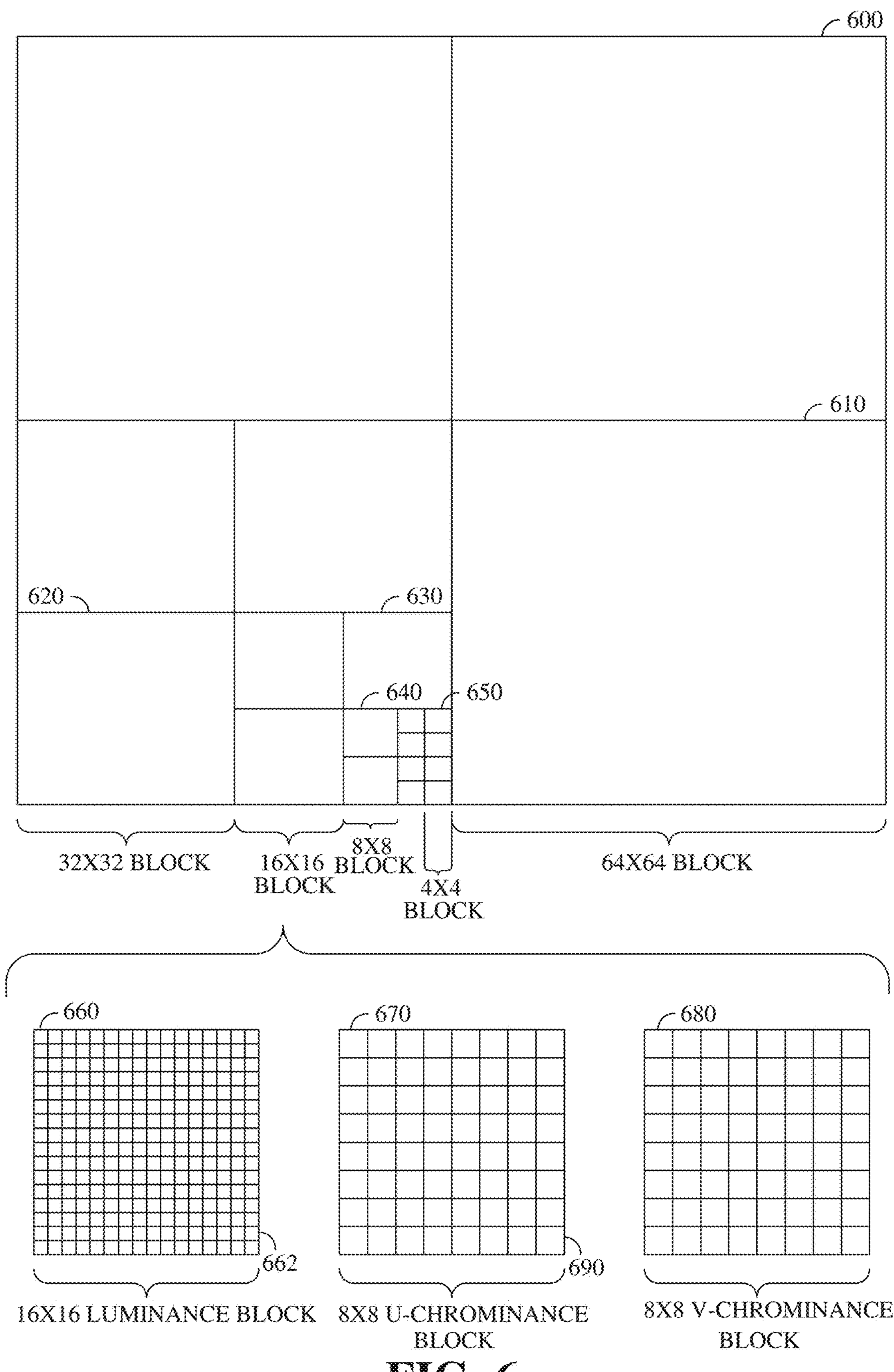
FIG. 6 is a block diagram of a representation of a portion of a frame according to implementations of this disclosure.

FIG. 6 is a block diagram of a representation of a portion 600 of a frame, such as the frame 306 of FIG. 3, according to implementations of this disclosure. As shown, the portion 600 of the frame includes four 64×64 blocks 610, which may be referred to as superblocks, in two rows and two columns in a matrix or Cartesian plane. A superblock can have a larger or a smaller size. While FIG. 6 is explained with respect to a superblock of size 64×64, the description is easily extendable to larger (e.g., 128×128) or smaller superblock sizes.

In an example, and without loss of generality, a superblock can be a basic or maximum coding unit (CU). Each CU can include four 32×32 blocks 620. Each 32×32 block 620 can include four 16×16 blocks 630. Each 16×16 block 630 can include four 8×8 blocks 640. Each 8×8 block 640 can include four 4×4 blocks 650. Each 4×4 block 650 can include 16 pixels, which can be represented in four rows and four columns in each respective block in the Cartesian plane or matrix. The pixels can include information representing an image captured in the frame, such as luminance information, color information, and location information. In an example, a block, such as a 16×16-pixel block as shown, can include a luminance block 660, which can include luminance pixels 662; and two chrominance blocks 670/680, such as a U or Cb chrominance block 670, and a V or Cr chrominance block 680. The chrominance blocks 670/680 can include chrominance pixels 690. For example, the luminance block 660 can include 16×16 luminance pixels 662, and each chrominance block 670/680 can include 8×8 chrominance pixels 690, as shown. Although one arrangement of blocks is shown, any arrangement can be used. Although FIG. 6 shows N×N blocks, in some implementations, N×M, where N≠M, blocks can be used. For example, 32×64 blocks, 64×32 blocks, 16×32 blocks, 32×16 blocks, or any other size blocks can be used. In some implementations, N×2N blocks, 2N×N blocks, or a combination thereof can be used.

Video coding can include ordered block-level coding. Ordered block-level coding can include coding blocks of a frame in an scan order, such as raster scan order, wherein blocks can be identified and processed starting with a block in the upper left corner of the frame, or a portion of the frame, and proceeding along rows from left to right and from the top row to the bottom row, identifying each block in turn for processing. For example, the CU in the top row and left column of a frame can be the first block coded, and the CU immediately to the right of the first block can be the second block coded. The second row from the top can be the second row coded, such that the CU in the left column of the second row can be coded after the CU in the rightmost column of the first row.

In an example, coding a block can include using quad-tree coding, which can include coding smaller block units with a block in raster-scan order. The 64×64 superblock shown in the bottom-left corner of the portion of the frame shown in FIG. 6, for example, can be coded using quad-tree coding in which the top-left 32×32 block can be coded, then the top-right 32×32 block can be coded, then the bottom-left 32×32 block can be coded, and then the bottom-right 32×32 block can be coded. Each 32×32 block can be coded using quad-tree coding in which the top-left 16×16 block can be coded, then the top-right 16×16 block can be coded, then the bottom-left 16×16 block can be coded, and then the bottom-right 16×16 block can be coded. Each 16×16 block can be coded using quad-tree coding in which the top-left 8×8 block can be coded, then the top-right 8×8 block can be coded, then the bottom-left 8×8 block can be coded, and then the bottom-right 8×8 block can be coded. Each 8×8 block can be coded using quad-tree coding in which the top-left 4×4 block can be coded, then the top-right 4×4 block can be coded, then the bottom-left 4×4 block can be coded, and then the bottom-right 4×4 block can be coded. In some implementations, 8×8 blocks can be omitted for a 16×16 block, and the 16×16 block can be coded using quad-tree coding in which the top-left 4×4 block can be coded, and then the other 4×4 blocks in the 16×16 block can be coded in raster-scan order.

Video coding can include compressing the information included in an original, or input, frame by omitting some of the information in the original frame from a corresponding encoded frame. For example, coding can include reducing spectral redundancy, reducing spatial redundancy, reducing temporal redundancy, or a combination thereof.

In an example, reducing spectral redundancy can include using a color model based on a luminance component (Y) and two chrominance components (U and V or Cb and Cr), which can be referred to as the YUV or YCbCr color model or color space. Using the YUV color model can include using a relatively large amount of information to represent the luminance component of a portion of a frame and using a relatively small amount of information to represent each corresponding chrominance component for the portion of the frame. For example, a portion of a frame can be represented by a high-resolution luminance component, which can include a 16×16 block of pixels, and by two lower resolution chrominance components, each of which representing the portion of the frame as an 8×8 block of pixels. A pixel can indicate a value (e.g., a value in the range from 0 to 255) and can be stored or transmitted using, for example, eight bits. Although this disclosure is described with reference to the YUV color model, any color model can be used.

Reducing spatial redundancy can include intra prediction of the block and transforming the residual block into the frequency domain as described above. For example, a unit of an encoder, such as the transform stage 404 of FIG. 4, can perform a DCT using transform coefficient values based on spatial frequency after intra/inter-prediction stage 402.

Reducing temporal redundancy can include using similarities between frames to encode a frame using a relatively small amount of data based on one or more reference frames, which can be previously encoded, decoded, and reconstructed frames of the video stream. For example, a block or a pixel of a current frame can be similar to a spatially corresponding block or pixel of a reference frame. A block or a pixel of a current frame can be similar to a block or a pixel of a reference frame at a different spatial location. As such, reducing temporal redundancy can include generating motion information indicating the spatial difference (e.g., a translation between the location of the block or the pixel in the current frame and the corresponding location of the block or the pixel in the reference frame). This is referred to as inter prediction above.

Reducing temporal redundancy can include identifying a block or a pixel in a reference frame, or a portion of the reference frame, that corresponds with a current block or pixel of a current frame. For example, a reference frame, or a portion of a reference frame, which can be stored in memory, can be searched for the best block or pixel to use for encoding a current block or pixel of the current frame. For example, the search may identify the block of the reference frame for which the difference in pixel values between the reference block and the current block is minimized, and can be referred to as motion searching. The portion of the reference frame searched can be limited. For example, the portion of the reference frame searched, which can be referred to as the search area, can include a limited number of rows of the reference frame. In an example, identifying the reference block can include calculating a cost function, such as a sum of absolute differences (SAD), between the pixels of the blocks in the search area and the pixels of the current block.

The spatial difference between the location of the reference block in the reference frame and the current block in the current frame can be represented as a motion vector. The difference in pixel values between the reference block and the current block can be referred to as differential data, residual data, or as a residual block. In some implementations, generating motion vectors can be referred to as motion estimation, and a pixel of a current block can be indicated based on location using Cartesian coordinates such as $f_{x,y}$. Similarly, a pixel of the search area of the reference frame can be indicated based on a location using Cartesian coordinates such as $r_{x,y}$. A motion vector (MV) for the current block can be determined based on, for example, a SAD between the pixels of the current frame and the corresponding pixels of the reference frame.

Figure 7:
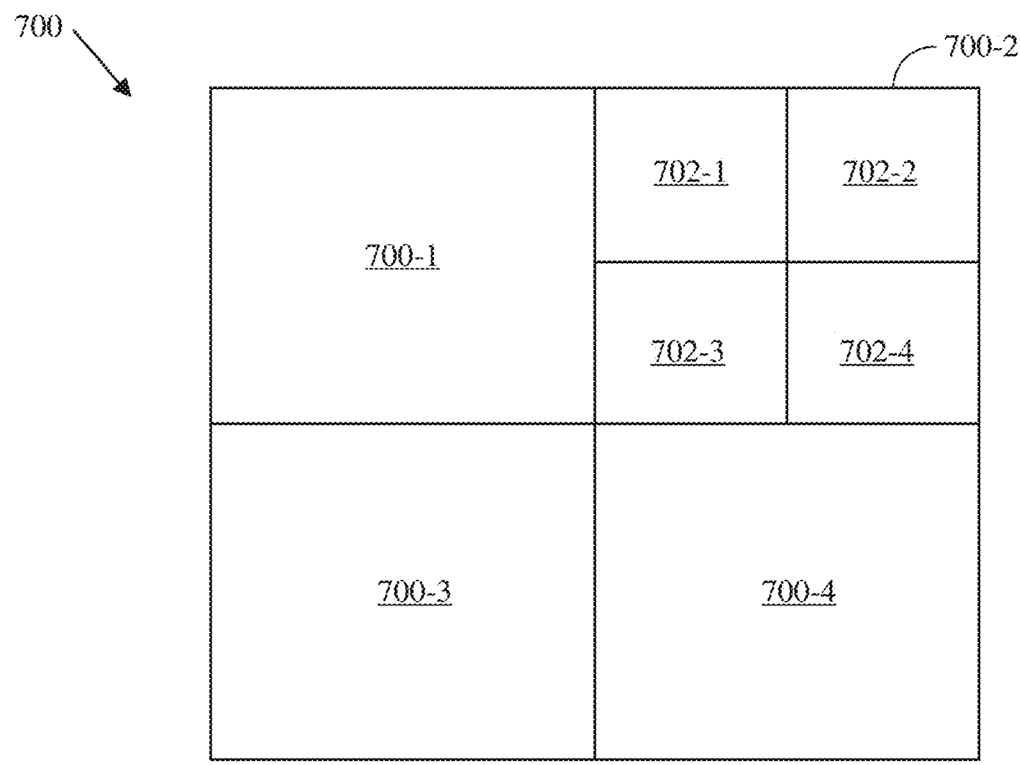
FIG. 7 is a block diagram of an example of a quad-tree representation of a block according to implementations of this disclosure.
Figure 7:
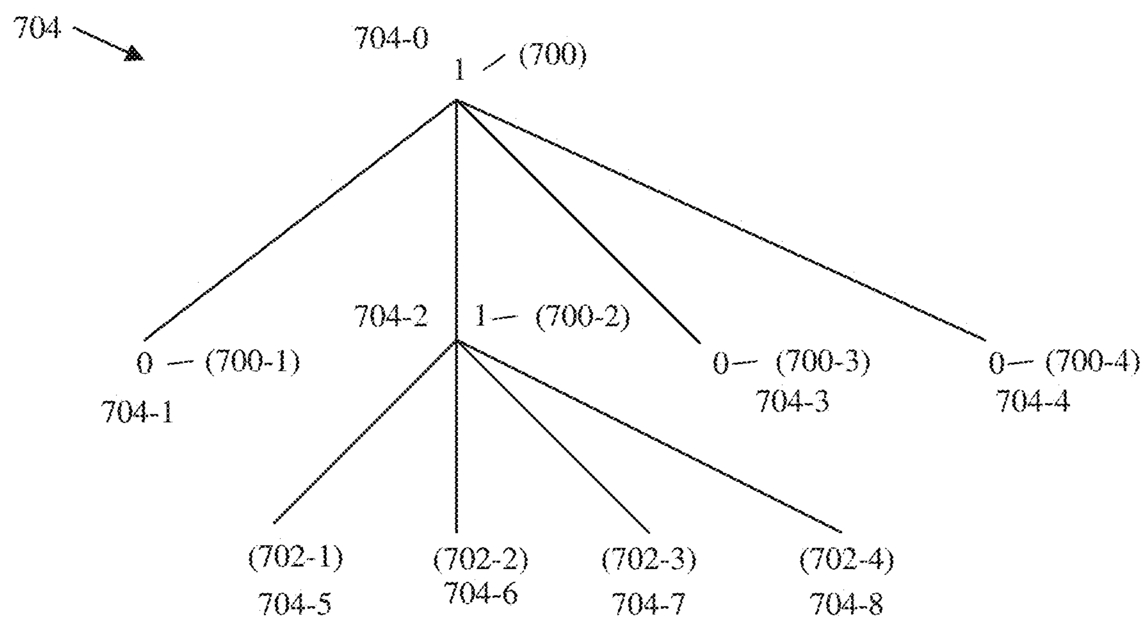

Although other partitions are possible, as described above in regards to FIG. 6, a CU or block may be coded using quad-tree partitioning or coding as shown in the example of FIG. 7. The example shows quad-tree partitioning of a block 700. However, the block 700 can be partitioned differently, such as by an encoder (e.g., the encoder 400 of FIG. 4) or a machine-learning model as described herein.

The block 700 is partitioned into four blocks, namely, the blocks 700-1, 700-2, 700-3, and 700-4. The block 700-2 is further partitioned into the blocks 702-1, 702-2, 702-3, and 702-4. As such, if, for example, the size of the block 700 is N×N (e.g., 128×128), then the blocks 700-1, 700-2, 700-3, and 700-4 are each of size N/2×N/2 (e.g., 64×64), and the blocks 702-1, 702-2, 702-3, and 702-4 are each of size N/4×N/4 (e.g., 32×32). If a block is partitioned, it is partitioned into four equally sized, non-overlapping square sub-blocks.

A quad-tree data representation is used to describe how the block 700 is partitioned into sub-blocks, such as blocks 700-1, 700-2, 700-3, 700-4, 702-1, 702-2, 702-3, and 702-4. A quad-tree 704 of the partition of the block 700 is shown. Each node of the quad-tree 704 is assigned a flag of "1" if the node is further split into four sub-nodes and assigned a flag of "0" if the node is not split. The flag can be referred to as a split bit (e.g., 1) or a stop bit (e.g., 0) and is coded in a compressed bitstream. In a quad-tree, a node either has four child nodes or has no child nodes. A node that has no child nodes corresponds to a block that is not split further. Each of the child nodes of a split block corresponds to a sub-block.

In the quad-tree 704, each node corresponds to a sub-block of the block 700. The corresponding sub-block is shown between parentheses. For example, a node 704-1, which has a value of 0, corresponds to the block 700-1.

A root node 704-0 corresponds to the block 700. As the block 700 is split into four sub-blocks, the value of the root node 704-0 is the split bit (e.g., 1). At an intermediate level, the flags indicate whether a sub-block of the block 700 is further split into four sub-sub-blocks. In this case, a node 704-2 includes a flag of "1" because the block 700-2 is split into the blocks 702-1, 702-2, 702-3, and 702-4. Each of nodes 704-1, 704-3, and 704-4 includes a flag of "0" because the corresponding blocks are not split. As nodes 704-5, 704-6, 704-7, and 704-8 are at a bottom level of the quad-tree, no flag of "0" or "1" is necessary for these nodes. That the blocks 702-5, 702-6, 702-7, and 702-8 are not split further can be inferred from the absence of additional flags corresponding to these blocks. In this example, the smallest sub-block is 32×32 pixels, but further partitioning is possible.

The quad-tree data representation for the quad-tree 704 can be represented by the binary data of "10100," where each bit represents a node of the quad-tree 704. The binary data indicates the partitioning of the block 700 to the encoder and decoder. The encoder can encode the binary data in a compressed bitstream, such as the compressed bitstream 420 of FIG. 4, in a case where the encoder needs to communicate the binary data to a decoder, such as the decoder 500 of FIG. 5.

The blocks corresponding to the leaf nodes of the quad-tree 704 can be used as the bases for prediction. That is, prediction can be performed for each of the blocks 700-1, 702-1, 702-2, 702-3, 702-4, 700-3, and 700-4, referred to herein as coding blocks. As mentioned with respect to FIG. 6, the coding block can be a luminance block or a chrominance block. It is noted that, in an example, the block partitioning can be determined with respect to luminance blocks. The same partition, or a different partition, can be used with the chrominance blocks.

A prediction type (e.g., intra- or inter-prediction) is determined at the coding block. That is, a coding block is the decision point for prediction.

A mode decision process (e.g., partition decision process) determines the partitioning of a coding block, such as the block 700. The partition decision process calculates the RD costs of different combinations of coding parameters. That is, for example, different combinations of prediction blocks and predictions (e.g., intra-prediction, inter-prediction, etc.) are examined to determine an optimal partitioning.

As a person skilled in the art recognizes, many mode decision processes can be performed by an encoder.

The machine-learning model can be used to generate estimates of the RD costs associated with respective modes, which are in turn used in the mode decision. That is, implementations according to this disclosure can be used for cases where a best mode is typically selected from among a set of possible modes, using RDO processes.

Figure 8:
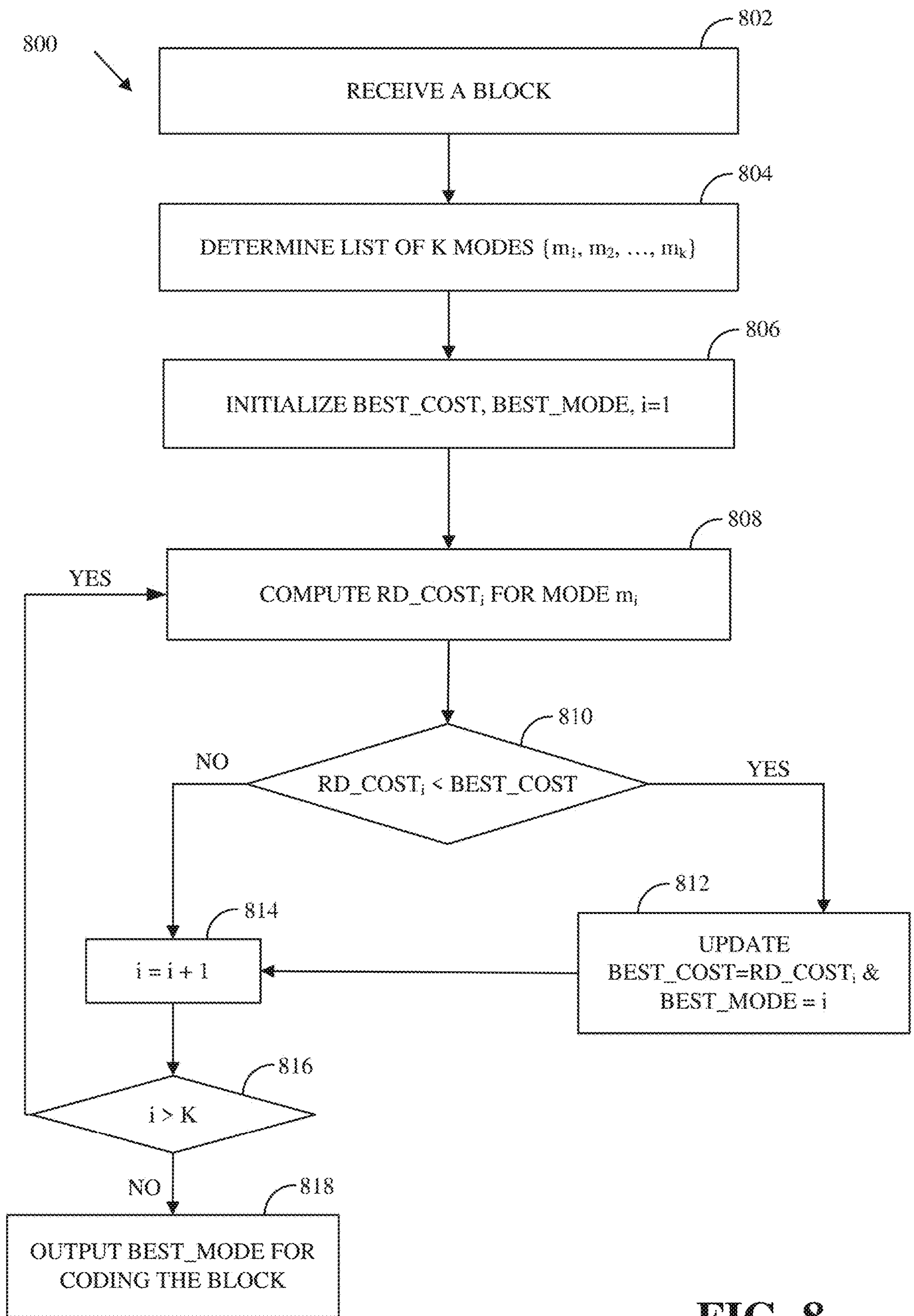
FIG. 8 is a flowchart of a process for searching for a best mode to code a block.

FIG. 8 is a flowchart of a process 800 for searching for a best mode to code a block. The process 800 is an illustrative, high level process of a mode decision process that determines a best mode of multiple available modes. For ease of description, the process 800 is described with respect to selecting an intra-prediction mode for encoding a prediction block. Other examples of best modes that can be determined by processes similar to the process 800 include determining a transform type and determining a transform size. The process 800 can be implemented by an encoder, such as the encoder 400 of FIG. 4, using a brute-force approach to the mode decision.

At 802, the process 800 receives a block. As the process 800 is described with respect to determining an intra-prediction mode, the block can be a prediction unit. Referring to FIG. 7, for example, each of the leaf node coding blocks (e.g., a block 700-1, 702-1, 702-2, 702-3, 702-4, 700-3, or 700-4) can be partitioned into one or more prediction units. As such, the block can be one such prediction unit.

At 804, the process 800 determines (e.g., selects, calculates, chooses, etc.) a list of modes. The list of modes can include K modes, where K is an integer number. The list of modes can be denoted $\{m_1, m_2, \ldots, m_k\}$. The encoder can have a list of available intra-prediction modes. For example, in the case of an AV1 codec, the list of available intra-prediction modes can be {DC_PRED, V_PRED, H_PRED, D45_PRED, D135_PRED, D117_PRED, D153_PRED, D207_PRED, D63_PRED, SMOOTH_PRED, SMOOTH_V_PRED, and SMOOTH_H_PRED, PAETH_PRED}. A description of these intra-prediction modes is omitted as the description is irrelevant to the understanding of this disclosure. The list of modes determined at 804 can be any subset of the list of available intra-prediction modes.

At 806, the process 800 initializes a BEST_COST variable to a high value (e.g., INT_MAX, which may be equal to 2,147,483,647) and initializes a loop variable i to 1, which corresponds to the first mode to be examined.

At 808, the process 800 computes or calculates an $RD\_COST_i$ for the $mode_i$. At 810, the process 800 tests whether the RD cost, $RD\_COST_i$, of the current mode under examination, $mode_i$, is less than the current best cost, BEST_COST. If the test is positive, then at 812, the process 800 updates the best cost to be the cost of the current mode (i.e., $BEST\_COST=RD\_COST_i$) and sets the current best mode index (BEST_MODE) to the loop variable i (BEST_MODE=i). The process 800 then proceeds to 814 to increment the loop variable i (i.e., i=i+1) to prepare for examining the next mode (if any). If the test is negative, then the process 800 proceeds to 814.

At 816, if there are more modes to examine, the process 800 proceeds back to 808; otherwise the process 800 proceeds to 818. At 818, the process 800 outputs the index of the best mode, BEST_MODE. Outputting the best mode can mean returning the best mode to a caller of the process 800. Outputting the best mode can mean encoding the image using the best mode. Outputting the best mode can have other semantics. The process 800 then terminates.

Figure 9:
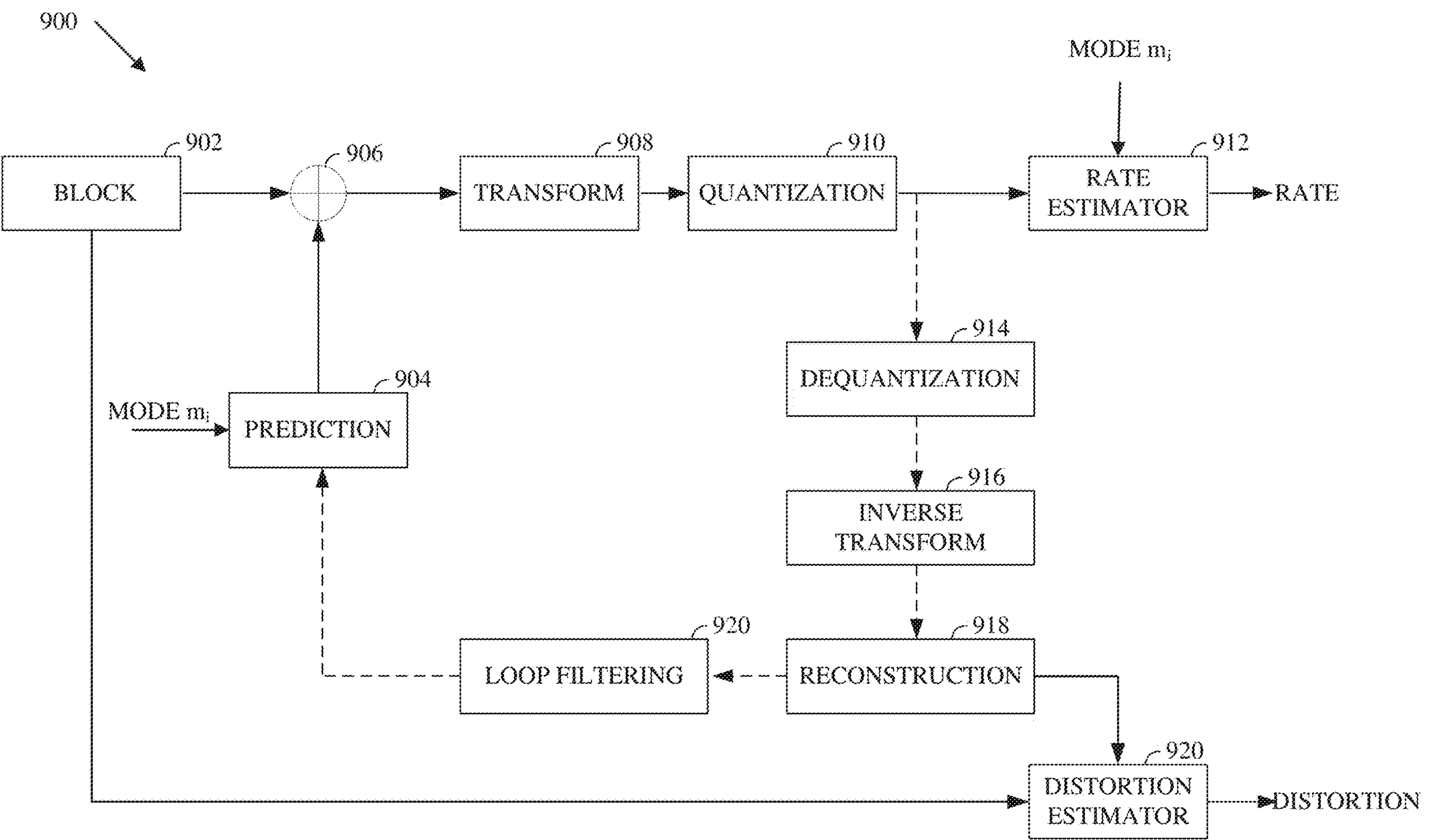
FIG. 9 is a block diagram of a process of estimating the rate and distortion costs of coding an image block by using a prediction mode.

FIG. 9 is a block diagram of a process 900 of estimating the rate and distortion costs of coding an image block X by using a coding mode $m_i$. The process 900 can be performed by an encoder, such as the encoder 400 of FIG. 4. The process 900 includes coding of the image block X using the coding mode $m_i$ to determine the RD cost of encoding the block. More specifically, the process 900 computes the number of bits (RATE) required to encode the image block X. The example 900 also calculates a distortion (DISTORTION) based on a difference between the image block X and a reconstructed version of the image block $X_d$. The process 900 can be used by the process 800 at 808. In this example, the coding mode $m_i$ is a prediction mode.

At 904, a prediction, using the mode $m_i$, is determined. The prediction can be determined as described with respect to intra/inter-prediction stage 402 of FIG. 4. At 906, a residual is determined as a difference between the image block 902 and the prediction. At 908 and 910, the residual is transformed and quantized, such as described, respectively, with respect to the transform stage 404 and the quantization stage 406 of FIG. 4. The rate (RATE) is calculated by a rate estimator 912, which performs the hypothetical encoding. In an example, the rate estimator 912 can perform entropy encoding, such as described with respect to the entropy encoding stage 408 of FIG. 4.

The quantized residual is dequantized at 914 (such as described, for example, with respect to the dequantization stage 410 of FIG. 4), inverse transformed at 916 (such as described, for example, with respect to the inverse transform stage 412 of FIG. 4), and reconstructed at 918 (such as described, for example, with respect to the reconstruction stage 414 of FIG. 4) to generate a reconstructed block. A distortion estimator 920 calculates the distortion between the image block X and the reconstructed block. In an example, the distortion can be a mean square error between pixel values of the image block X and the reconstructed block. The distortion can be a sum of absolute differences error between pixel values of the image block X and the reconstructed block. Any other suitable distortion measure can be used.

The rate, RATE, and distortion, DISTORTION, are then combined into a scalar value (i.e., the RD cost) by using the Lagrange multiplier as shown in formula (5)

$$\text{DISTORTION}+\lambda_{mode}\times\text{RATE}, \tag{5}$$

The Lagrange multiplier $\lambda_{mode}$ of the formula 5 can vary (e.g., depending on the encoder performing the operations of the process 900).

FIGS. 8 and 9 illustrate an approach to mode decisions in a block-based encoder that is largely a serial process that essentially codes an image block X by using candidate modes to determine the mode with the best cost. Techniques have been used to reduce the complexity in mode decisions. For example, early termination techniques have been used to terminate the loop of the process 800 of FIG. 8 as soon as certain conditions are met, such as, for example, that the rate distortion cost is lower than a threshold. Other techniques include selecting, for example based on heuristics, a subset of the available candidate modes or using multi-passes over the candidate modes.

Figure 10:
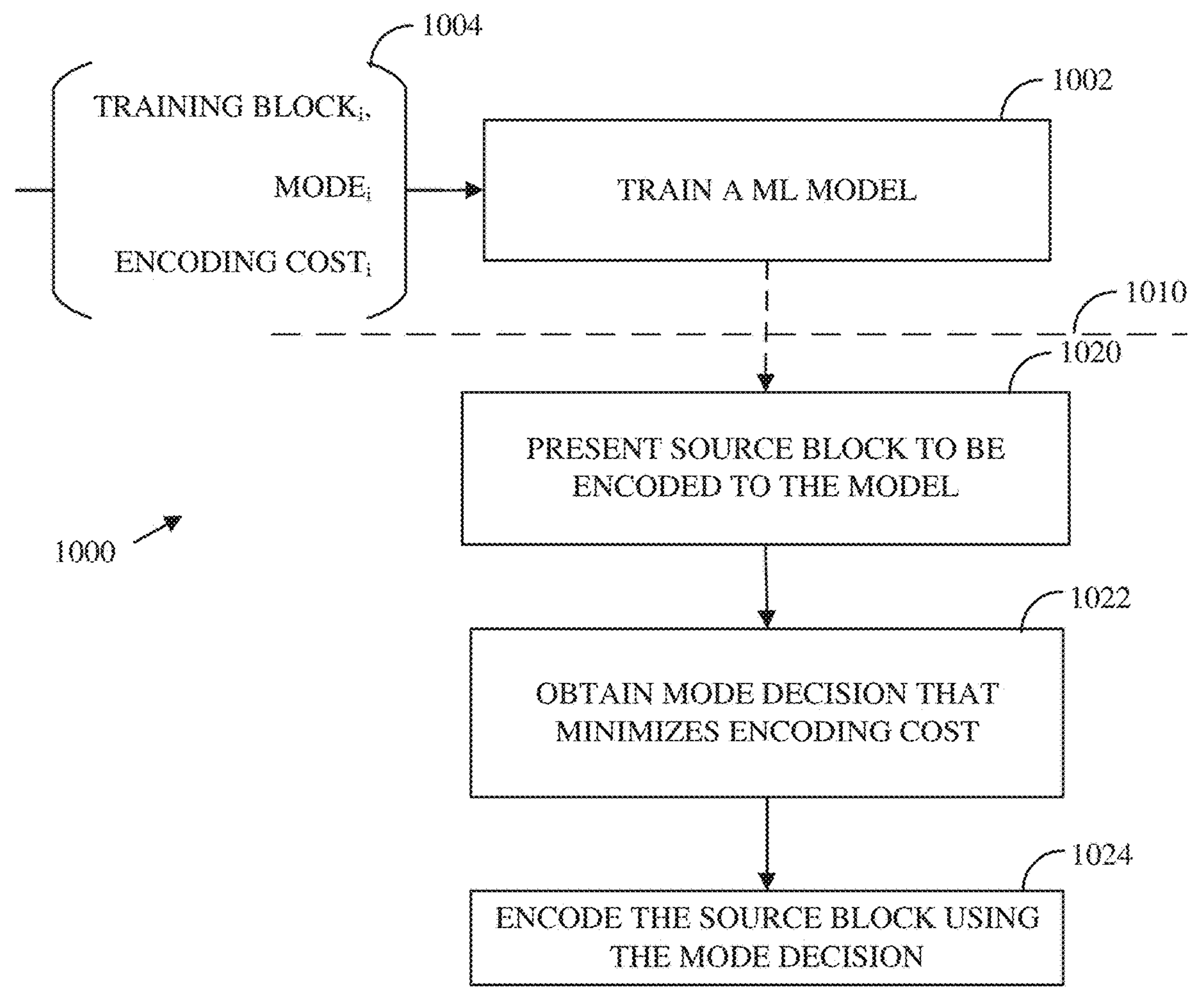
FIG. 10 is a flowchart of a process for encoding a block of a video stream according to implementations of this disclosure.

FIG. 10 is a flowchart of a process 1000 for encoding, using a machine-learning model, a block of a video stream according to implementations of this disclosure. The process 1000 includes two phases: a training phase and an inference phase. For simplicity of explanation, the training and inference phases are shown as phases of one process (i.e., the process 1000). However, the training and inference phases are often separate processes.

At 1002, the process 1000 trains the machine-learning (ML) mode. The ML model can be trained using training data 1004 as input. The training data 1004 is a set of training data. Each training datum is indicated by a subscript i. Each training datum of the training data 1004 can include a video block (i.e., a training $\text{block}_i$) that was encoded by traditional encoding methods (e.g., by a block-based encoder), such as described with respect to FIGS. 4 and 6-9; one or more modes, used by the encoder for encoding the training $\text{block}_i$: and the resulting encoding $\text{cost}_i$, as determined by the encoder, of encoding the training block, using the $\text{mode}_i$. In the training phase, parameters of the ML model are generated such that, for at least some of the training data 1004, the ML model can infer, for a training datum, the $\text{mode}_i$, encoding $\text{cost}_i$, or both. During the training phase at 1002, the ML model learns (e.g., trains, builds, derives, etc.) a mapping (i.e., a function) from the inputs to the outputs. The mode can be a partition decision, or any other mode decision for compression or reconstruction in video coding. The mode can include a combination of mode decisions.

The block may be an image block, a prediction block, or a transform block, for example, of a source frame. The block can be a residual block, that is, the difference between a source image block and a prediction block. As such, the encoding mode can be related to any of these blocks. For example, the encoding mode can include a partition mode, an intra- or inter-prediction mode, a transform mode, etc., and the encoding cost can be the cost of encoding a block using the encoding mode. In addition to the input data shown, the input data can include block features of the training block, during the training phase. Which block features are calculated (e.g. generated) and used as input to the machine-learning model can depend on the encoding mode. For example, different block features can be extracted (e.g., calculated, determined, etc.) for an encoding mode related to a transform block than an encoding mode related to a prediction block.

In an example, the encoding cost can include two separate values; namely, a rate and a distortion from which a RD cost can be calculated as described above. In an example, the encoding cost can include, or can be, the RD cost value itself.

The ML model can then be used by the process 1000 during an inference phase. As shown, the inference phase includes the operations 1020 and 1022. A separation 1010 indicates that the training phase and the inference phase can be separated in time. As such, the inferencing phase can be performed using a different encoder than that used to train the machine-learning model at 1002. In an example, the same encoder is used. In either case, the inference phase uses a machine-learning model that is trained as described with respect to 1002.

While not specifically shown, during the inferencing phase, the process 1000 receives a source block for which a best mode for encoding the block in a bitstream is to be determined. The best mode can be the partitioning that minimizes encoding cost. The best mode can be a mode that relates to a block, such as a transform type or a transform size. The best mode can be a mode that relates to an intra-prediction block, such as intra-prediction mode. The best mode can be a mode that relates to an inter-prediction block, such as an interpolation filter type. The best mode can be a combination of modes for encoding and optionally reconstructing a source block.

At 1020, the source block is presented to the model that is trained as described with respect to 1002. At 1022, the process 1000 obtains (e.g., generates, calculates, selects, determines, etc.) the mode decision that minimizes encoding cost (e.g., the best mode) as the output of the machine-learning model. At 1024, the process 1000 encodes, in a compressed bitstream, the block using the best mode.

Information that is derived from the source block during the inference phase of the encoding process 1000 is not readily available to different mode decisions of the encoder or to a decoder. Also, the process 1000 is well-adapted for image compression, but is more difficult to apply to video compression. For at least these reasons, while neural network encoders (e.g., those implementing a machine-learning model) may be better in representing and restoring high frequency information and residuals, conventional encoders are often better at capturing simple motion and coding low frequencies.

In a hybrid approach described herein, motion may be largely handled conventionally, and neural networks may operate over dimensions at the frame, block, etc., level. In this way, for example, side information that would not otherwise be available to a neutral network may be available. This improves the use of a neural network encoder with video compression, for example. Such a structure may be represented generally by FIG. 11, which is a block diagram of an example of a codec 1100 comprising a neural network with side information. This arrangement may be considered a modification of learned image compression, where the network learns (through training) how to get close to the optimum rate-distortion function of the source X. The side information Y may be used in the neural network with guide information for guided restoration. A goal of the design of FIG. 11 and its variations is to, given a source image represented by the source X and a degraded image represented by the input Y (also referred to as degraded source data), send minimal guide information from the source X that allows the side information Y to be transformed to $X_d$, where $X_d$ is closer to the source X than to the side information Y. A conventional encoder pipeline may encode a bitstream, which produces a base layer reconstruction. The base layer reconstruction may be used as the side information Y, while separate guide information provided by the source X yields a restored signal $X_d$ (also referred to as the reconstructed source data).

Figure 11:
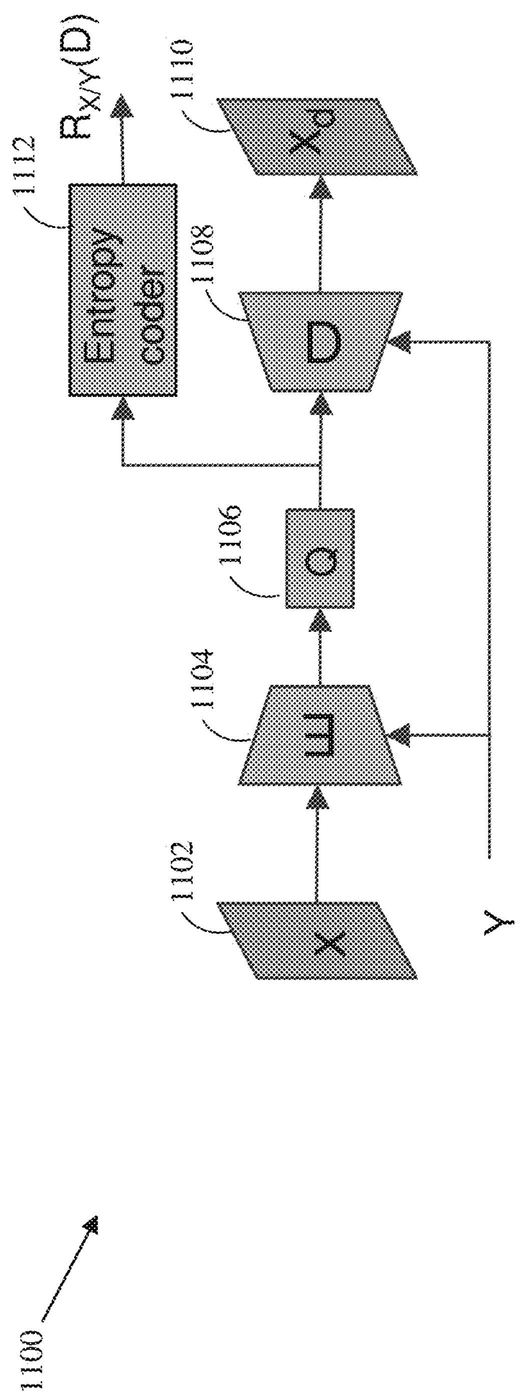
FIG. 11 is a block diagram of an example of a codec comprising a neural network with side information according to implementations of this disclosure.

In FIG. 11, the source (e.g., the input) X 1102 is input to an encoder 1104 that incorporates a decoder 1108 for reconstruction of the source X 1102, which is the reconstructed source or output $X_d$ 1110. The encoder 1104 and the decoder 1108 may comprise one or more neural networks that embody a machine-learning model that can be developed according to the teachings herein. For example, the encoder may be referred to a neural network encoder 1104, and the decoder 1108 may be referred to as a neural network decoder 1108. The machine-learning model may be trained to get close to the optimum rate distortion function of the source information, such as a source block. That is, the neural network(s) may be trained so that the reconstructed source $X_d$ 1110 is substantially similar to the source X 1102. For example, the reconstructed source $X_d$ 1110 is substantially similar to the source X 1102 when an encoding cost is minimized. The encoding cost may be a rate-distortion value in some implementations. In FIG. 11, the objective function $R_{X/Y}(D)$ to which the neural network(s) are trained is the rate R to transmit the source X 1102 given known side information Y at a distortion D.

Once trained, the codec 1100 can produce an output, or compressed, bitstream for transmission to a decoder, or for storage. The compressed bitstream may be generated by quantizing block residuals from the encoder 1104 using the quantizer 1106, and entropy coding the quantized residuals using the entropy coder 1112. The block residuals may or may not be transformed. The quantizer 1106 may operate similarly to the quantization stage 406 of FIG. 4. The entropy coder 1112 may operate similarly to the entropy encoding stage 408 of FIG. 4. The bitstream from the entropy coder 1112 may be transmitted to a decoder, such as one structured similarly to the decoder 1108.

The codec 1100 receives side information Y as input, examples of which are described below. In general, side information is information that is correlated with the source X, and is available to both an encoder and decoder without modification by the neural network(s) thereof. The available side information is provided to the neural network to derive guided information that, together with the side information, can reconstruct the source. In this way, the guided information may be considered enhancement information. The structure of the codec 1100 provides a powerful framework that can achieve many hybrid video encoding architectures by changing the side information Y.

Figure 12:
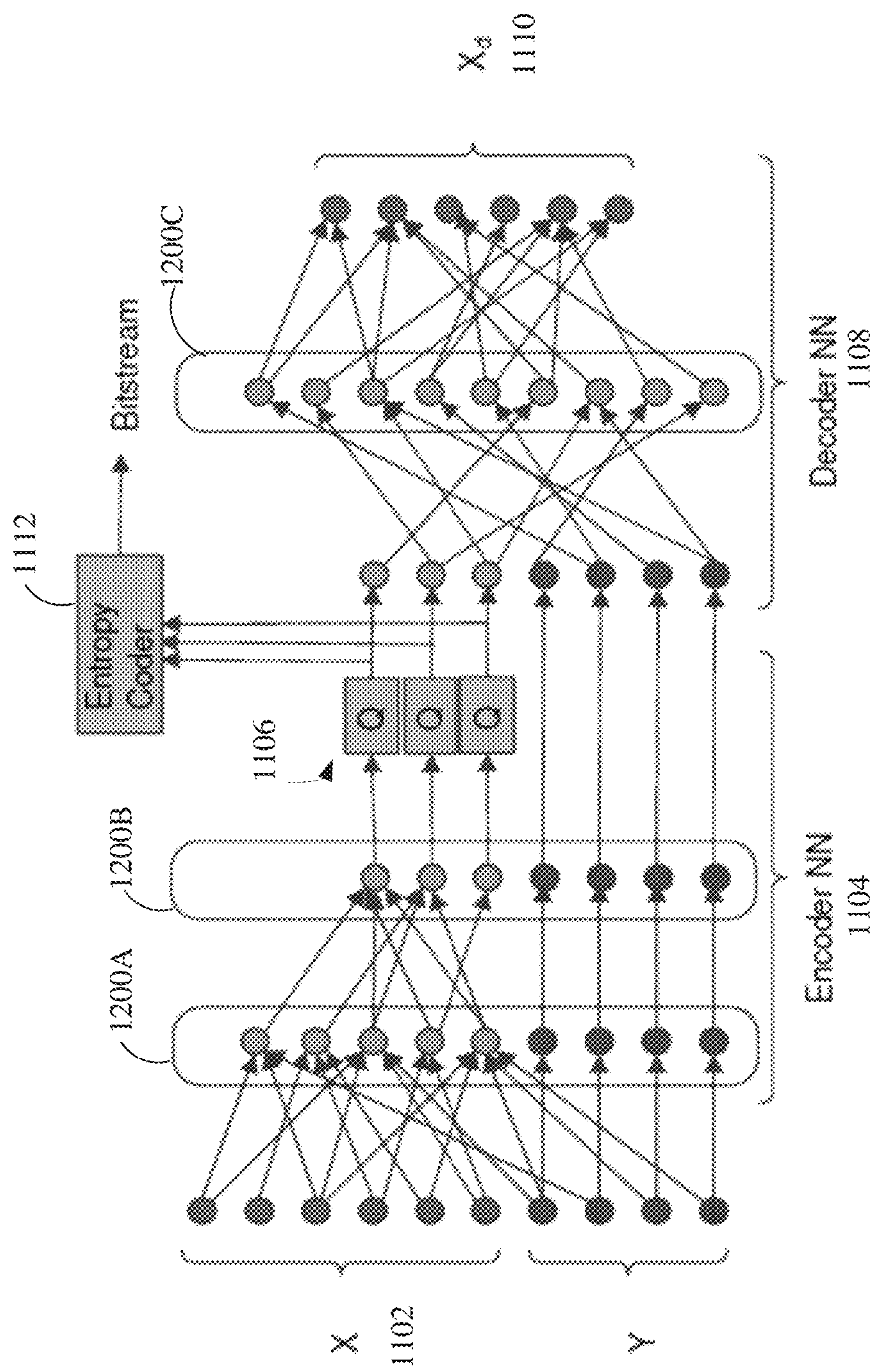
FIG. 12 is a block diagram of an example of a neural network that can be used to implement the codec of FIG. 11.

FIG. 12 is a block diagram of a neural network that can be used to implement the codec of FIG. 11. The neural network may comprise a CNN and/or a fully-connected neural network. In this example, constraints are added to the neural network structure so as to pass through the side information Y from the input to the encoder and to a single (e.g., the first) layer of the decoder.

At a high level, and without loss of generality, the machine-learning model, such as a classification deep-learning model, includes two main portions: a feature-extraction portion and a classification portion. The feature-extraction portion detects features of the model. The classification portion attempts to classify the detected features into a desired response. Each of the portions can include one or more layers and/or one or more operations. The term “classification” is used herein to refer to the one or more of the layers that outputs one or more values from the model. The output may be a discrete value, such as a class or a category. The output may be a continuous value (e.g., a rate value, a distortion value, a RD cost value). As such, the classification portion may be appropriately termed a regression portion.

As mentioned above, a CNN is an example of a machine-learning model. In a CNN, the feature-extraction portion often includes a set of convolutional operations. The convolution operations may be a series of filters that are used to filter an input image based on a filter (typically a square of size k, without loss of generality). For example, and in the context of machine vision, these filters can be used to find features in an input image. The features can include, for example, edges, corners, endpoints, and so on. As the number of stacked convolutional operations (e.g., layers) increases, later convolutional operations can find higher-level features. It is noted that the term “features” is used in two different contexts within this disclosure. First, “features” can be extracted, from an input image or block, by the feature-extraction portion of a CNN. Second, “features” can be calculated (e.g., derived) from an input block and used as inputs to a machine-learning model. Context makes clear which use of the term “features” is intended.

In a CNN, the classification (e.g., regression) portion can be a set of fully connected layers. The fully connected layers can be thought of as looking at all the input features of an image in order to generate a high-level classifier. Several stages (e.g., a series) of high-level classifiers eventually generate the desired regression output.

As mentioned, a CNN may be composed of a number of convolutional operations (e.g., the feature-extraction portion) followed by a number of fully connected layers. The number of operations of each type and their respective sizes may be determined during the training phase of the machine learning. As a person skilled in the art recognizes, additional layers and/or operations can be included in each portion. For example, combinations of Pooling, MaxPooling, Dropout, Activation, Normalization, BatchNormalization, and other operations can be grouped with convolution operations (i.e., in the feature-extraction portion) and/or the fully connected operation (i.e., in the classification portion). The fully connected layers may be referred to as Dense operations. A convolution operation can use a SeparableConvolution2D or Convolution2D operation.

As used in this disclosure, a convolution layer can be a group of operations starting with a Convolution2D or SeparableConvolution2D operation followed by zero or more operations (e.g., Pooling, Dropout, Activation, Normalization, BatchNormalization, other operations, or a combination thereof), until another convolutional layer, a Dense operation, or the output of the CNN is reached. Similarly, a Dense layer can be a group of operations or layers starting with a Dense operation (i.e., a fully connected layer) followed by zero or more operations (e.g., Pooling, Dropout, Activation, Normalization, BatchNormalization, other operations, or a combination thereof) until another convolution layer, another Dense layer, or the output of the network is reached. Although not used in the example of FIG. 12, the boundary between feature extraction based on convolutional networks and a feature classification using Dense operations can be marked by a Flatten operation, which flattens the multidimensional matrix from the feature extraction into a vector.

Each of the fully connected operations is a linear operation in which every input is connected to every output by a weight. As such, a fully connected layer with N number of inputs and M outputs can have a total of N×M weights. A Dense operation may be followed by a non-linear activation function to generate an output of that layer.

In the neural network of FIG. 12, three hidden layers 1200A, 1200B, and 1200C are included. The first hidden layer 1200A may be a feature-extraction layer, while the second hidden layer 1200B and third hidden layer 1200C may be classification layers.

Data of the source X comprises input data from the video stream. The input data can include pixel data, such as luma or chroma data, position data, such as x- and y-coordinates, etc. Together with the source X, the side information Y is provided to the first hidden layer 1200A for feature extraction. The resulting extracted features are then used for classification at the second hidden layer 1200B. In this example, the output to the quantizers 1106 comprises block residuals (e.g., for the luma and each of the chroma blocks) that may or may not be transformed as described previously. This is by example only, and other information needed to reconstruct the blocks may also be transmitted (e.g., the partitioning, etc.).

The encoder 1104 passes through the side information Y to a single, here the first, layer (e.g., the third hidden layer 1200C) of the decoder 1108. That is, the side information Y passes through the layers of the encoder 1104, after being used for feature extraction in the first hidden layer 1200A, so as to be used in reconstruction in the first layer of the decoder 1108. When reference is made to "passing through" the side information Y, the disclosure herein means transmitting the side information Y, or whatever information is needed to recreate the side information Y, from the encoder 1104 to the decoder 1108. In FIG. 12, the side information Y passes through the hidden layers of the encoder 1104 to the decoder 1108. Alternatively, the side information Y (e.g., the information needed to recreate the side information Y) may jump (or bypass) one or more layers of the encoder 1104 as described below in regards to FIG. 13. In either case, the neural network may be referred to as a constrained network because the neural network is constrained by the side information Y. That is, a layer in each of the encoder 1104 and the decoder 1108 relies upon the side information Y.

Figure 13:
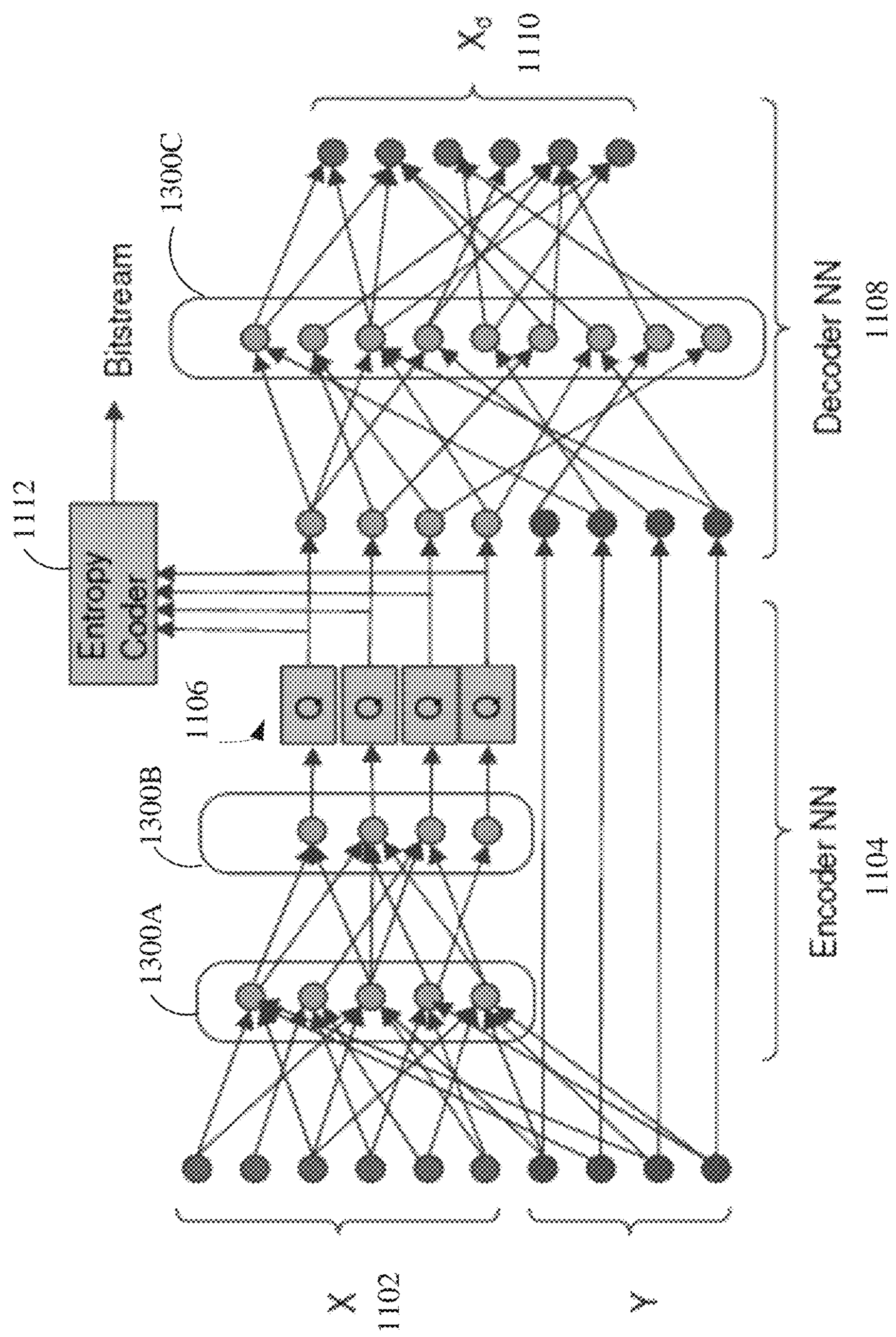
FIG. 13 is a block diagram of another example of a neural network that can be used to implement the codec of FIG. 11.

FIG. 13 is a block diagram of another neural network that can be used to implement the codec of FIG. 11. The neural network may comprise a CNN and/or a fully-connected neural network similar to that described with regard to FIG. 12. Also in this example, constraints are added to the neural network structure so as to pass through the side information Y from the input to the encoder and to the first layer of the decoder.

In the neural network of FIG. 13, three hidden layers 1300A, 1300B, and 1300C are included. The first hidden layer 1300A may be a feature-extraction layer, while the second hidden layer 1300B and third hidden layer 1300C may be classification layers.

Data of the source X comprises input data from the video stream. The input data can include pixel data, such as luma or chroma data, position data, such as x- and y-coordinates, etc. Together with the source X, the side information Y is provided to the first hidden layer 1300A for feature extraction. The resulting extracted features are then used for classification at the second hidden layer 1300B. The output to the quantizers 1106 may comprise block residuals (e.g., for the luma and each of the chroma blocks) that may or may not be transformed as described previously. Information needed to reconstruct the blocks may also be transmitted (e.g., the partitioning, etc.).

The encoder 1104 passes the side information Y to the first layer (e.g., the third hidden layer 1300C) of the decoder 1108. In the encoder 1104 of FIG. 12, the side information Y passes through one or more hidden layers after the first layer of the encoder 1104 so as to be used in reconstruction in the first layer of the decoder 1108. In contrast, the side information Y bypasses one or more hidden layers of the encoder 1104 of FIG. 13 so as to pass through the side information Y, or information needed to recreate the side information Y, to the first layer of the decoder 1108.

The third hidden layer 1300C uses the side information Y, together with the output of the quantizers 1106, as input, and provides the reconstructed source or output $X_d$ 1110. FIG. 13 is another example of a constrained network, in that a layer of each of the encoder 1104 and the decoder 1108 relies upon the side information Y.

While three hidden layers are shown in FIGS. 12 and 13, this is by example only. A neural network includes at least one, and often multiple layers, hidden or otherwise. Accordingly, more than three layers or less than three layers may be used in either implementation. In addition, the number of layers used by each of the encoder 1104 and decoder 1108 may differ from that shown. For example, the decoder 1108 may include one or more additional layers subsequent to the third hidden layer 1300C, where the subsequent layers do not receive the side information Y as input, and instead receive input from the third hidden layer 1200C. A block diagram of a variation in the example of the neural network of FIG. 13 in shown in FIG. 14.

Figure 14:
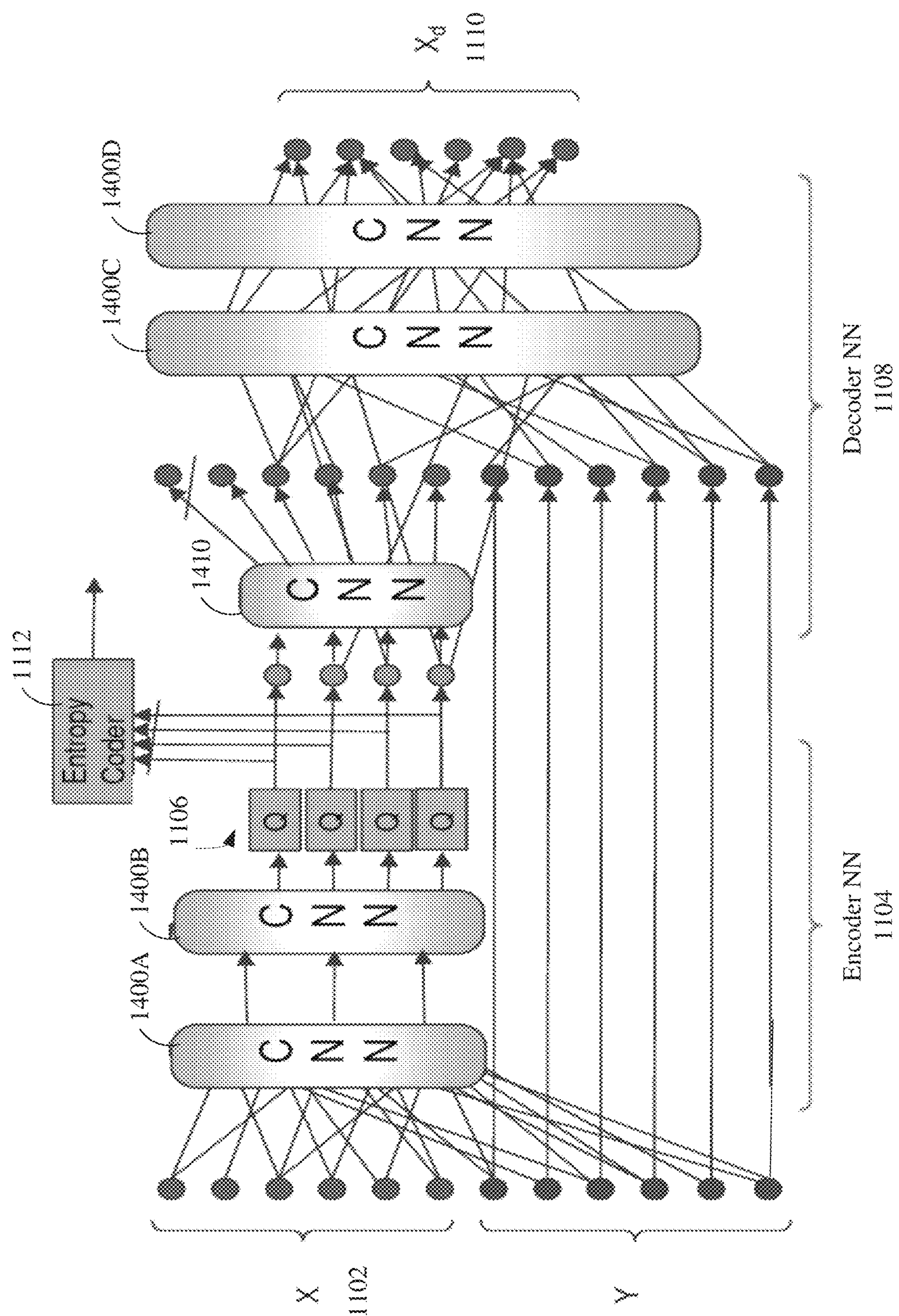
FIG. 14 is a block diagram of a variation in the example of the neural network of FIG. 13.

The neural network in FIG. 14 includes at least four hidden layers 1400A, 1400B, 1400C, and 1400D. The first hidden layer 1400A may be a feature-extraction layer, while the second hidden layer 1400B, the third hidden layer 1400C, and the fourth hidden layer 1400D may be classification layers. In this example, convolution operations are used for each of feature extraction and classification, instead of using fully-connected layers for classification. Hence, this may be referred to as a convolution-only neural network. This is not required, and fully-connected layers may also or alternatively be used for classification.

Data of the source X comprises input data from the video stream. The input data 1102 can include pixel data, such as luma or chroma data, position data, such as x- and y-coordinates, etc. Together with the source X, the side information Y is provided to the first hidden layer 1400A for feature extraction. The resulting extracted features are then used for classification at the second hidden layer 1400B. The output to the quantizers 1106 may comprise block residuals (e.g., for the luma and each of the chroma blocks) that may or may not be transformed as described previously. Information needed to reconstruct the blocks may also be transmitted (e.g., the partitioning, etc.).

The encoder 1104 passes the side information Y to a single layer (e.g., the first layer) of the decoder 1108. More specifically, and as in FIG. 13, the side information Y bypasses one or more hidden layers of the encoder 1104 of FIG. 14 so as to pass through the side information Y, or information needed to recreate the side information Y, to the decoder 1108.

FIG. 14 differs from FIG. 13 in that, among other things, FIG. 14 includes an expander layer 1410 that may be considered part of the decoder 1108. The expander layer 1410 may be another hidden, convolution layer. The expander layer 1410 receives the output from the quantizers 1106 as input, and expands the information from that output for use as input to the third hidden layer 1300C. As discussed above with regard to FIG. 11, the guided information obtained from the source X for input to the decoder 1108 is desirably minimized through the training of the codec, such as the codec of FIG. 14. Accordingly, the expander layer 1410 may be incorporated to allow the encoder 1104 to send less information than the codec of FIG. 12 or 13. The expander layer 1410 receives the output from the quantizers 1106, and that information is expanded, that is, the amount of data is increased through convolution operations to form the guided information for input to the first layer (e.g., the third hidden layer 1400C) of the decoder 1108. For example, the amount of data may be increased by increasing the resolution of the guided information from the encoder 1104.

While the expander layer 1410 may be referred to as part of the decoder 1108, it is not considered to be the first layer of the decoder 1108. Instead, it is considered a pre-layer that generates the guided information for input to the first layer of the decoder. The first layer of the decoder is the first layer where both the guided information and the side information Y are input.

The third hidden layer 1400C uses the side information Y, together with the output of the expander layer 1410, as input, and performs convolution operations to provide output to the fourth hidden layer 1400D. The fourth hidden layer 1400D performs convolution operations on the output from the third hidden layer 1400C to output the reconstructed source or output $X_d$ 1110. FIG. 14 may be described as a constrained network because a layer of each of the encoder 1104 and the decoder 1108 relies upon (i.e., is constrained by) the side information Y.

It is clear from the above description that the expander layer 1410 may perform upscaling. Hence, the expander layer 1410 may be referred to as an upscaling layer. The presence of the layer 1410 illustrates that the side information Y and the input data 1102 (or correspondingly the output of the quantizers 1106) may not be of the same resolution. Accordingly, the layer 1410 may instead be a reducing layer, that is, a layer that reduces the amount of data through convolution operations to form the guided information for input to the first layer (e.g., the third hidden layer 1400C) of the decoder 1108. For example, the amount of data may be decreased by decreasing the resolution of the guided information from the encoder 1104. Hence, the layer 1410 may be referred to as a downscaling layer. More generally, the layer 1410 may be referred to as a resolution adjustment layer or normalizing layer.

In some implementations such as that shown in FIG. 14, the resolution adjustment layer may be a trained layer (implemented using machine learning). In other implementations, the resolution adjustment layer may perform any one or more of standard algorithms to change the resolution of its input in accordance with the resolution of the side information Y. It is also possible for the layer 1410 to be omitted. In such implementations, the expanding or reducing functions otherwise performed by the layer 1410 may be performed by the third hidden layer 1400C by training that layer using the two data sources at different resolutions as input with the output to the fourth hidden layer 1400D being at full or reduced resolution, whichever is indicated for the reconstructed source or output $X_d$ 1110.

The structure of each of FIGS. 11 to 14 provides for end-to-end training of the neural network. In this way, the network automatically learns how to restore Y to get Xd as well as what minimal information to send as guide.

Figure 15:
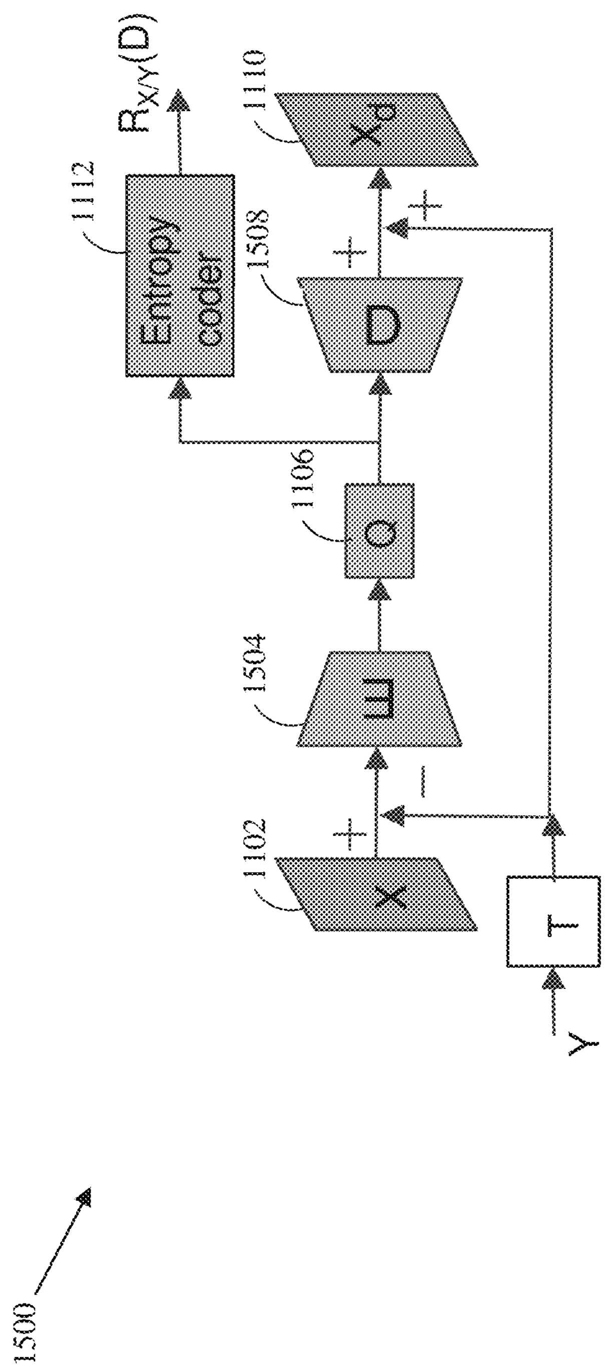
FIG. 15 is a block diagram of an alternative example of a codec comprising a neural network with side information according to implementations of this disclosure.

In an alternative example to that shown in FIGS. 11 to 14, the neural network structure is not constrained by the side information Y. FIG. 15 is a block diagram of an alternative example of a codec 1500 comprising a neural network with side information according to implementations of this disclosure. The codec 1500 is similar to the codec 1100 except for the structure of the neural network that forms the encoder 1504 and the decoder 1508.

More specifically, the input, which may be the same source X 1102 of FIG. 11, is input to an encoder 1504 that incorporates a decoder 1508 for reconstruction of the source X 1102, which is the reconstructed output or source $X_d$ 1110. The encoder 1504 and the decoder 1508 may comprise one or more neural networks that embody a machine-learning model that can be developed according to the teachings herein. For example, the encoder 1504 may be referred to as a neural network encoder, and the decoder 1508 may be referred to as a neural network decoder.

The codec 1500 produces the output, or compressed, bitstream $R_{X/Y}(D)$ for transmission to a decoder, or for storage. The compressed bitstream $R_{X/Y}(D)$ may be generated by quantizing block residuals from the encoder 1504 using the quantizer 1106, and entropy coding the quantized residuals using the entropy coder 1112. The block residuals may or may not be transformed. The quantizer 1106 may operate similarly to the quantization stage 406 of FIG. 4. The entropy coder 1112 may operate similarly to the entropy encoding stage 408 of FIG. 4.

The codec 1500 receives side information Y as input, examples of which are described below. In contrast to the codec 1100, in this example structural constraints are not imposed on the neural network to take account of the side information Y. Instead, a simplified model is used whereby side information is used as input by generating a difference X−T(Y) that is coded using the neural network formed of the encoder 1504 and the decoder 1508. That is, the difference X−T(Y) is used as input to the first layer of the encoder 1504. The machine-learning model may be trained to get close to the optimum rate distortion function of the difference. The neural network(s) may be trained so that the output of the decoder 1508 is substantially similar to the difference X−T(Y). For example, the output is substantially similar to the difference X−T(Y) when an encoding cost is minimized. The encoding cost may be a rate-distortion value in some implementations.

The side information T(Y) is defined by a deterministic transformation of Y such that the information T(Y) is at the same resolution as the source X 1102. Accordingly, the side information T(Y) may be used to generate the reconstructed source or output $X_d$ 1110 by adding the side information T(Y) to the output of the decoder 1508.

While layers of the codec 1500 are not shown, the codec 1500 may have a similar structure to the codec 1100 as shown in the examples of FIGS. 12-14, except for the inclusion of structure allowing the pass through of the side information Y. An advantage of the codec 1500 over the codec 1100 is that the structure of the neural network is easier. A variety of neural network application programming interfaces (APIs) may be used (e.g., trained) due to the lack of side information constraints on the neural network structure. However, the codec 1500 may have reduced performance (e.g., higher rate-distortion values) due to loss of the structure in the side information Y.

It is noted that details of machine learning, neural networks, including convolutional neural networks, and/or details that would be known to a person skilled in the art based on the description herein are omitted. For example, a skilled person in the art recognizes that the values of convolutional filters and the weights of connections between nodes (i.e., neurons) in a CNN are determined by the CNN during the training phase. Accordingly, such are not discussed in detail herein. In each of FIGS. 11-15, an encoder that integrates a decoding stage labeled as a decoder is described. This is a similar arrangement as described in regards to FIG. 4. While not expressly shown in these figures, another decoder having a similar structure to that of the decoder 1108 or 1508 may be used to reconstruct the source data/information using the side information and source data as inputs into (e.g., at least a first hidden layer of) the decoder.

In the discussion above, the side information Y is described as being derived from conventional encoding methods. The side information Y may be any side information that is correlated with the source information. The side information Y may be a product of the encoder itself, such as where only portions of the encoder are implemented via a neural network. That is, the encoder may be a hybrid encoder that includes certain block-based components as described with the example of FIGS. 3-5, or object-based components as are known to those skilled in the art, combined with one or more neural networks. In this example, the hybrid encoder may itself produce (and use) the side information. The side information Y may also be determined by a second encoder, where the second encoder provides the side information Y to the first (e.g., neural network) encoder.

The side information Y (or a function thereof) is used with a deep neural network that may have structural constraints that enforce the availability of the side information Y on the decoder side. The information derived from the neural network layer(s) may be considered guided or enhancement information for the video being coded, as described briefly above. Many variations of the side information Y, and hence the enhancement information, are possible.

In a first example of a hybrid codec according to the teachings herein, the side information Y may be used in prediction residue (residual) coding and reconstruction. For example, the side information Y may be a full resolution predictor or prediction signal from a traditional motion-based predictor (e.g., a prediction block from inter prediction, such as performed at intra/inter-prediction stage 402). The neural network may learn, for example, the optimal residue transform (i.e., the transform that produces the lowest rate-distortion value) for the residual resulting from the source X (e.g., the block) and the full resolution predictor. The full resolution predictor may also improve reconstruction by the decoder, due to the availability of the structure (i.e., the features) of the full resolution predictor. In this example, a hybrid video encoder results where only the residue coding in a conventional encoder is modified. Because conventional video compression codes the prediction residue independently of the prediction, the inclusion of the prediction as side information with the neural network may provide a better reconstruction of the original video data.

In another example of a hybrid codec according to the teachings herein, the neural network may be used for restoration with guided information. For example, a conventional encoder may be used to encode a bitstream, which may be referred to as a base layer. Then, the base layer reconstruction may be used as the side information Y to refine the source X in a separate guided layer. In this way, a form of scalable encoding is formed.

In an implementation of this latter technique, a conventional encoder may encode a base layer bitstream at reduced resolution. The reduced-resolution reconstruction from the conventional base layer (e.g., the per-frame reduced resolution reconstruction) may be used as side information Y, while encoding the high-resolution information using the source X. This process generates a form of spatial scalable encoding where the motion information is at the reduced resolution only. Even in such a design, it is expected that advantages (e.g., in rate-distortion values) will result for small reduction ratios, low bitrates, or both.

When using the base layer bitstream in the spatial scalability model, the base layer bitstream may be decoded independently of the enhancement neural network layer. Some loss in coding efficiency is expected because of the loss of precision in the motion information. However, this allows a design whereby the training of the neural networks can be open-looped. This may be implemented with two encoders as described above, for example.

In another design using the base layer bitstream in the spatial scalability model, in-loop super-resolution may be implemented. That is, the output of the full-resolution enhancement neural network layer may be used to refresh frame buffers used to encode subsequent frames. In this way, the reference frame buffers may always be at full resolution (e.g., the reference frame buffers are able to store full-resolution reference frames). The coded frames at lower resolution can be use scaled motion compensation. This in-loop design, in contrast to the open-looped design above, may be implemented using a single hybrid encoder.

The artificial neural networks with side information may also be used to generate multimode predictors. In such an implementation, source X may be the data to predict, while the side information Y may be the data used to predict the source X. For example, the side information Y may include neighboring pixels for intra prediction. The neural network would then be trained by using the results of the exhaustive analysis previously described as input, where the results comprise the most efficient intra-prediction mode for respective training blocks (e.g., the intra-prediction mode resulting in the lowest encoding cost). Fully-connected layers may be desirable in this design for classification (e.g., instead of convolution layers), because such a design may be used to more tightly control the size (e.g., the number of parameters) of the layers. For example, the available modes in the multimode predictor may be considered to limit the passing of just a few bits of information.

The codecs 1100 and 1500 of FIGS. 11-15 include both an encoder and a decoder. This arrangement represents a structure for training the neural network, and may represent an encoder at a transmitting station 102. Where the output of the entropy coder 1112 (and hence the codec 1100 or codec 1500) is transmitted or stored for playback on a separate decoder, such as at a receiving station 106 where the codec 1100 or the codec 1500 are located at the transmitting station 102, the decoder may correspond in structure to a trained implementation of the decoder 1108 or the decoder 1508, together with another decoder or portions of another decoder, such as the decoder 500 of FIG. 5. In either case, the decoder can use the output of the entropy coder 1112 to generate the side information for inclusion in the first layer of the neural network portion of the decoder, or can receive the side information as signals separate from the signals from the entropy coder 1112 for inclusion in the first layer of the neural network portion of the decoder.

An artificial neural network with side information as described above provides a powerful framework that can address many use cases of interest. The neural network has structural constraints that enforce availability of the side information on the decoder side. The side information may be derived from conventional encoding methods or any other degrading process (i.e., one that degrades the source). Many variations are possible depending on what the side information is.

For simplicity of explanation, the processes herein are depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The aspects of encoding and decoding described above illustrate some encoding and decoding techniques. However, it is to be understood that "encoding" and "decoding," as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as being preferred or advantageous over other aspects or designs. Rather, use of the words "example" or "implementation" is intended to present concepts in a concrete fashion. As used in this application, the term "or" is intended to mean an inclusive "or" rather than an exclusive "or." That is, unless specified otherwise or clearly indicated otherwise by the context, "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms, and/or instructions described herein. In addition, or alternatively, for example, a special-purpose computer/processor, which can contain other hardware for carrying out any of the methods, algorithms, or instructions described herein, can be utilized.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other transmitting station 102 and receiving station 106 implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A hybrid apparatus for coding a video stream, comprising:

a first encoder that receives source data from the video stream and receives side information correlated with the source date, the first encoder comprising:

a neural network having at least one hidden layer, wherein the neural network:

receives the source data at a first hidden layer of the at least one hidden layer;

receives the side information at the first hidden layer; and generates guided information using the source data and the side information; and an entropy coder that entropy encodes block data from the source data into a compressed bitstream, wherein:

the first encoder outputs the compressed bitstream from the entropy coder to a decoder, the neural network outputs the guided information, and the first encoder, in addition to providing the side information to the neural network, outputs the side information separately from the compressed bitstream so that the side information bypasses the neural network for the decoder to reconstruct the source data from the compressed bitstream and the side information to produce reconstructed source data.

2. The hybrid apparatus of claim 1, further comprising:

a second encoder generating, using the source data, the side information for input to the first encoder.

3. The hybrid apparatus of claim 2, wherein:

the second encoder includes a second decoder, and the side information comprises decoded source data from the second decoder.

4. The hybrid apparatus of claim 1, wherein:

the first encoder includes a first decoder that reconstructs the source data to form reconstructed source data, and the neural network is trained to minimize a rate-distortion value between the source data and the reconstructed source data.

5. The hybrid apparatus of claim 1, wherein:

the first encoder includes a first decoder, and the neural network comprises multiple hidden layers, at least the first hidden layer of the multiple hidden layers forming the first encoder, and at least a second hidden layer of the multiple hidden layers forming the first decoder, and the first decoder receiving the guided information and the side information for reconstruction of the source data.

6. The hybrid apparatus of claim 5, wherein:

each hidden layer of the first encoder is structured to pass through the side information such that a first layer of the first decoder receives the side information.

7. The hybrid apparatus of claim 1, wherein the first encoder includes a first decoder, the hybrid apparatus further comprising:

a deterministic transform that transforms the side information before providing the side information to the first encoder and the first decoder.

8. The hybrid apparatus of claim 1, wherein:

the side information comprises a full resolution prediction signal generated using motion prediction.

9. The hybrid apparatus of claim 8, wherein:

the neural network is trained to select a transform for a block residual within the full resolution prediction signal to minimize a rate-distortion value.

10. The hybrid apparatus of claim 1, further comprising:

a second encoder generating, using the source data, the side information for input to the first encoder, wherein the second encoder comprises a block-based encoder.

11. The hybrid apparatus of claim 1, wherein:

the side information comprises a per-frame reduced resolution reconstruction of a reduced-resolution base layer, and the neural network generates a high-resolution layer using the per-frame reduced resolution reconstruction.

12. The hybrid apparatus of claim 1, further comprising:

a second encoder generating, using the source data, the side information for input to the first encoder, wherein the second encoder comprises a block-based encoder; and reference frame buffers for storing full-resolution reference frames output from the neural network for use in predicting subsequent frames.

13. A method for coding a video stream, comprising:

providing source data from the video stream to a first encoder that includes an entropy coder and a neural network;

generating, using the source data, side information;

inputting the side information to the neural network for encoding the source data to form encoded source data that includes at least block residuals;

entropy encoding, using the entropy coder, the encoded source data into a compressed bitstream;

transmitting the compressed bitstream from the entropy coder of the first encoder to a decoder or to storage; and transmitting the side information from the first encoder to the decoder or to the storage, wherein the side information is transmitted separately from the compressed bitstream without modification by the neural network such that the side information transmitted from the first encoder is unchanged from the side information that is input to the neural network of the first encoder.

14. The method of claim 13, wherein generating the side information comprises performing motion prediction using the source data to output a prediction signal.

15. The method of claim 14, wherein performing motion prediction using the source data to output a prediction signal comprises using the first encoder for performing the motion prediction.

16. The method of claim 13, further comprising:

transforming the side information to a same resolution as the source data to produce transformed side information; and generating difference information comprising a difference between the source data and the transformed side information, wherein providing the source data to the neural network comprises providing the difference information to the neural network.

17. The method of claim 13, wherein the first encoder includes a first decoder, the neural network comprises a plurality of hidden layers, and the first encoder passes the side information through at least one hidden layer to only a first hidden layer of the first decoder.

18. A hybrid apparatus for coding a video stream, comprising:

a first encoder and a first decoder comprising a neural network having a plurality of hidden layers, wherein the neural network:

receives source data from the video stream at a first hidden layer of the first encoder;

receives side information correlated with the source data at the first hidden layer of the first encoder;

generates guided information using the source data and the side information; and receives the guided information and the side information at a first hidden layer of the first decoder for reconstruction of the source data, and wherein:

the first encoder comprises an entropy coder to entropy encode at least block residuals of the source data into a compressed bitstream, the first encoder transmits the compressed bitstream to the second decoder for reconstruction of the source data, and the first encoder outputs the side information separately from the compressed bitstream to the first decoder so that the side information, in addition to being received by the neural network, is also transmitted to the first decoder unchanged by the neural network.

19. The hybrid apparatus of claim 18, wherein the neural network further comprises an expander layer that receives the guided information from the first encoder and increases an amount of data in the guided information, and transmits the guided information to the first hidden layer of the first decoder.

20. The method of claim 13, wherein the transmitting the side information from the first encoder bypasses the neural network.

* * * * *